United States Patent
Kobayashi et al.

(10) Patent No.: US 11,725,992 B2
(45) Date of Patent: Aug. 15, 2023

(54) SENSOR, INPUTTING DEVICE, AND ELECTRONIC APPARATUS

(71) Applicant: SONY CORPORATION, Tokyo (JP)

(72) Inventors: Ken Kobayashi, Kanagawa (JP); Akira Ebisui, Kanagawa (JP); Yoshiaki Sakakura, Kanagawa (JP); Tomoko Katsuhara, Kanagawa (JP); Hayato Hasegawa, Kanagawa (JP); Manami Miyawaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 319 days.

(21) Appl. No.: 16/958,504

(22) PCT Filed: Dec. 28, 2018

(86) PCT No.: PCT/JP2018/048434
§ 371 (c)(1),
(2) Date: Jun. 26, 2020

(87) PCT Pub. No.: WO2019/135401
PCT Pub. Date: Jul. 11, 2019

(65) Prior Publication Data
US 2020/0348191 A1    Nov. 5, 2020

(30) Foreign Application Priority Data

Jan. 5, 2018   (JP) ................................ 2018-000815

(51) Int. Cl.
*G01L 1/14*        (2006.01)
*G06F 3/044*       (2006.01)

(52) U.S. Cl.
CPC ............ *G01L 1/142* (2013.01); *G06F 3/0445* (2019.05); *G06F 2203/04102* (2013.01)

(58) Field of Classification Search
CPC ..... A61B 5/6833; A61B 5/14517; A61B 5/01; A61B 5/6839; A61B 5/6843;
(Continued)

(56) References Cited

U.S. PATENT DOCUMENTS 5,447,076 A       9/1995   Ziegler
10,507,268 B2 *  12/2019   Hall ....................... A61L 31/10
(Continued)

FOREIGN PATENT DOCUMENTS

CN       102012771 A     4/2011
CN       102138120 A     7/2011
(Continued)

OTHER PUBLICATIONS

International Search Report and Written Opinion of PCT Application No. PCT/JP2018/048434, dated Jan. 29, 2019, 08 pages of ISRWO.

(Continued)

*Primary Examiner* — William Lu
(74) *Attorney, Agent, or Firm* — Chip Law Group

(57) ABSTRACT

A sensor includes a capacitive sensor electrode layer, a reference electrode layer, and an elastic layer provided between the sensor electrode layer and the reference electrode layer. A thickness of the elastic layer is 100 µm or less, and a weight per unit area of the elastic layer is less than 3 mg/cm².

20 Claims, 16 Drawing Sheets

(58) Field of Classification Search
CPC .............. A61B 5/6844; A61B 2562/18; A61B 2562/166; A61B 5/24; A61B 2560/04; A61B 2562/164
See application file for complete search history.

(56) References Cited

U.S. PATENT DOCUMENTS

| | | | | |
|---|---|---|---|---|
| 10,884,557 | B2* | 1/2021 | Yoon | G06F 3/0447 |
| 2003/0209847 | A1* | 11/2003 | Allison | H05K 13/0069 |
| | | | | 269/21 |
| 2004/0158305 | A1* | 8/2004 | Axelgaard | A61N 1/0452 |
| | | | | 607/142 |
| 2005/0169656 | A1* | 8/2005 | Nihonyanagi | G03G 15/2025 |
| | | | | 399/327 |
| 2006/0081062 | A1* | 4/2006 | Silverbrook | B60C 23/0408 |
| | | | | 73/754 |
| 2006/0137901 | A1* | 6/2006 | Yu | H10K 59/1275 |
| | | | | 174/250 |
| 2007/0179376 | A1* | 8/2007 | Gerder | A61B 5/282 |
| | | | | 600/509 |
| 2008/0202251 | A1 | 8/2008 | Serban et al. | |
| 2010/0107770 | A1 | 5/2010 | Serban et al. | |
| 2011/0057904 | A1 | 3/2011 | Yamano | |
| 2013/0197664 | A1* | 8/2013 | Ballard | B01D 39/04 |
| | | | | 623/23.72 |
| 2014/0356703 | A1* | 12/2014 | Dennes | H01M 50/489 |
| | | | | 429/211 |
| 2015/0114814 | A1* | 4/2015 | Suzuki | H01H 13/703 |
| | | | | 200/512 |
| 2015/0335288 | A1* | 11/2015 | Toth | A61B 5/6833 |
| | | | | 600/391 |
| 2016/0026318 | A1 | 1/2016 | Yamano | |
| 2016/0192857 | A1* | 7/2016 | Lee | A61B 5/681 |
| | | | | 600/382 |
| 2016/0299598 | A1 | 10/2016 | Yoon et al. | |
| 2016/0361270 | A1* | 12/2016 | Stoddard | A61K 31/46 |
| 2017/0056650 | A1* | 3/2017 | Cohen | A61B 5/6804 |
| 2017/0160819 | A1* | 6/2017 | Yi | G06F 3/03 |
| 2018/0052557 | A1 | 2/2018 | Yamano | |
| 2018/0164923 | A1* | 6/2018 | Hirabayashi | G06F 3/0446 |
| 2020/0264058 | A1* | 8/2020 | Kim | G01L 1/18 |
| 2020/0315072 | A1* | 10/2020 | Howland | B32B 15/20 |

FOREIGN PATENT DOCUMENTS

| | | | |
|---|---|---|---|
| CN | 104949777 | A | 9/2015 |
| CN | 105278792 | A | 1/2016 |
| CN | 105431804 | A | 3/2016 |
| CN | 106092384 | A | 11/2016 |
| CN | 107478360 | A | 12/2017 |
| EP | 2115410 | A1 | 11/2009 |
| EP | 2306282 | A2 | 4/2011 |
| JP | H0660765 | A | 3/1994 |
| JP | 2008-210557 | A | 9/2008 |
| JP | 2008210557 | A | 9/2008 |
| JP | 2010-101827 | A | 5/2010 |
| JP | 2011-059822 | A | 3/2011 |
| JP | 2016-201091 | A | 12/2016 |
| JP | 2016-201113 | A | 12/2016 |
| KR | 10-1652029 | B1 | 8/2016 |
| WO | 2008/104493 | A1 | 9/2008 |
| WO | WO-2013063445 | A2 * | 5/2013 ............ G01L 1/142 |
| WO | 2016/143241 | A1 | 9/2016 |
| WO | 2016/167529 | A1 | 10/2016 |
| WO | 2017188130 | A1 | 11/2017 |

OTHER PUBLICATIONS

Office Action for CN Patent Application No. 201880084367.2 dated Aug. 11, 2021, 07 pages of Office Action.
Office Action for JP Application No. 2019-563981 dated May 31, 2022, pp. 4.

* cited by examiner

SENSOR, INPUTTING DEVICE, AND ELECTRONIC APPARATUS

CROSS REFERENCE TO RELATED APPLICATIONS

This application is a U.S. National Phase of International Patent Application No. PCT/JP2018/048434 filed on Dec. 28, 2018, which claims priority benefit of Japanese Patent Application No. JP 2018-000815 filed in the Japan Patent Office on Jan. 5, 2018. Each of the above-referenced applications is hereby incorporated herein by reference in its entirety.

TECHNICAL FIELD

The present disclosure relates to a sensor, an inputting device, and an electronic apparatus.

BACKGROUND ART

In recent years, electronic apparatuses that can detect pressing of the surface of a housing have been proposed. For example, PTL 1 proposes, as one of such electronic apparatuses, an apparatus that includes a film-like sensor on the inner side face of a housing.

CITATION LIST

Patent Literature

[PTL 1]
Pamphlet of PCT International Publication No. WO2016/143241

SUMMARY

Technical Problem

Since a housing of an electronic apparatus generally has high rigidity, a sensor having high sensitivity is demanded.
The object of the present disclosure resides in provision of a sensor having good sensitivity and an inputting device and an electronic apparatus that include the sensor.

Solution to Problem

In order to solve the subject described above, a first disclosure is a sensor including a capacitive sensor electrode layer, a reference electrode layer, and an elastic layer provided between the sensor electrode layer and the reference electrode layer. A thickness of the elastic layer is 100 μm or less, and a weight per unit area of the elastic layer is less than 3 mg/cm$^2$.

A second disclosure is an inputting device including an exterior body, the sensor according to the first disclosure, and a support for supporting the sensor so as to oppose to the exterior body.

A third disclosure is an electronic apparatus including an exterior body, the sensor according to the first disclosure, and a support for supporting the sensor so as to oppose to the exterior body.

Advantageous Effect of Invention

According to the present disclosure, a sensor having good sensitivity can be obtained. It is to be noted that the effect described here is not necessarily restrictive and may be any of effects described in the present disclosure or may be an effect different from the effects.

DESCRIPTION OF EMBODIMENT

An embodiment of the present disclosure is described in the following order.
  Configuration of electronic apparatus
  Circuit configuration of electronic apparatus
  Manipulation regions of electronic apparatus
  Operation of sensor
  Operation of electronic apparatus
  Effect
  Modification

Configuration of Electronic Apparatus

Figure 1A:
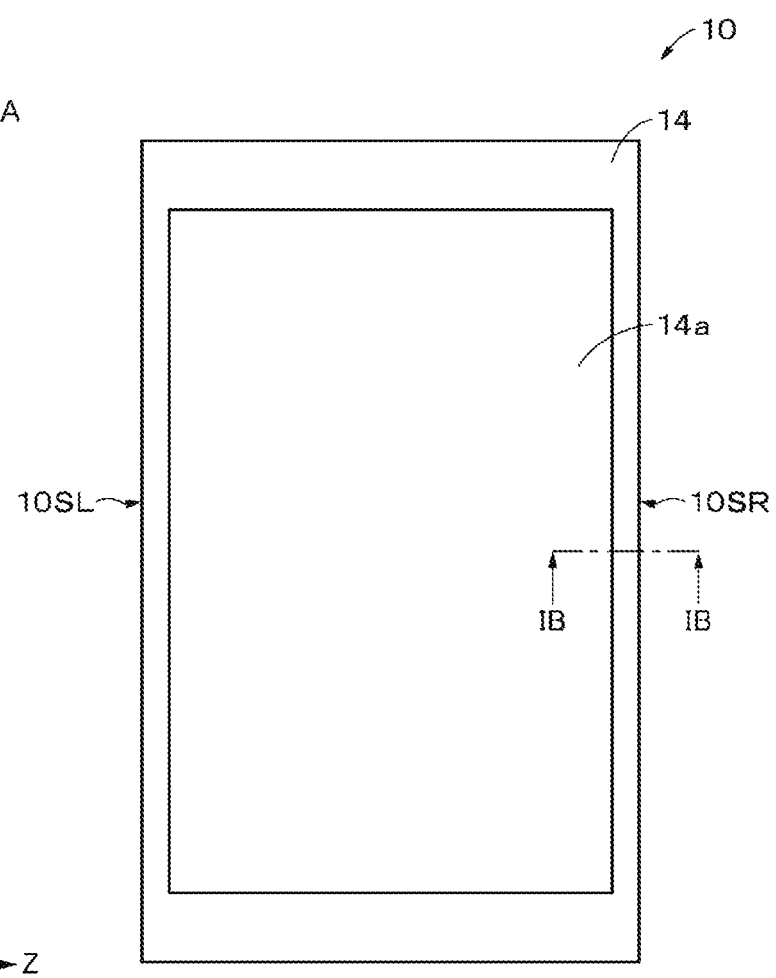
FIG. 1A is a plan view depicting an appearance of an electronic apparatus according to an embodiment of the present disclosure.
Figure 1B:
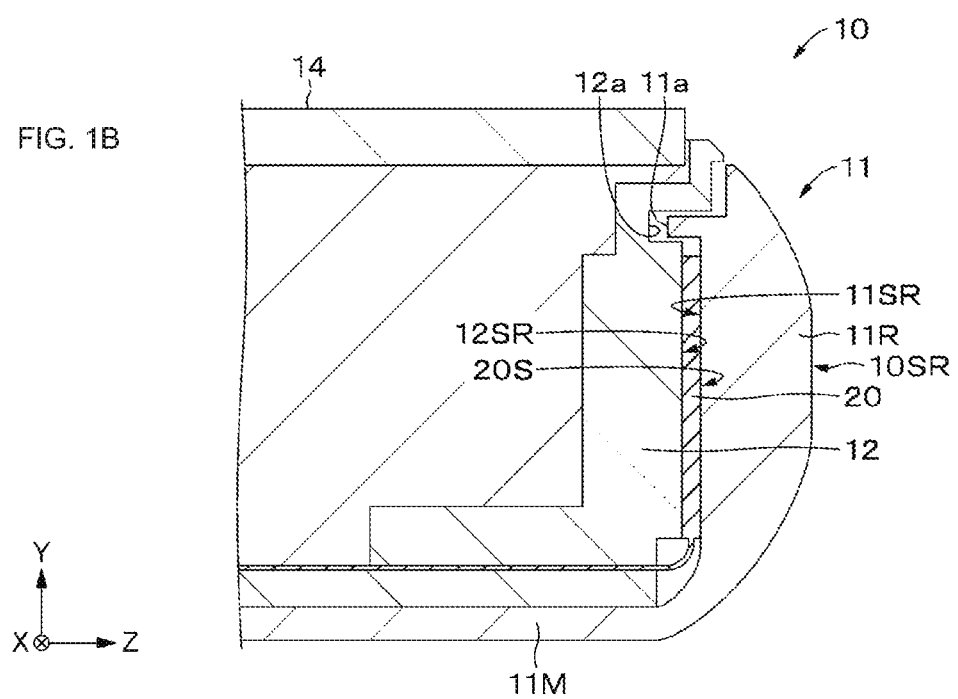
FIG. 1B is a sectional view taken along line IB-IB of FIG. 1A.
Figure 2:
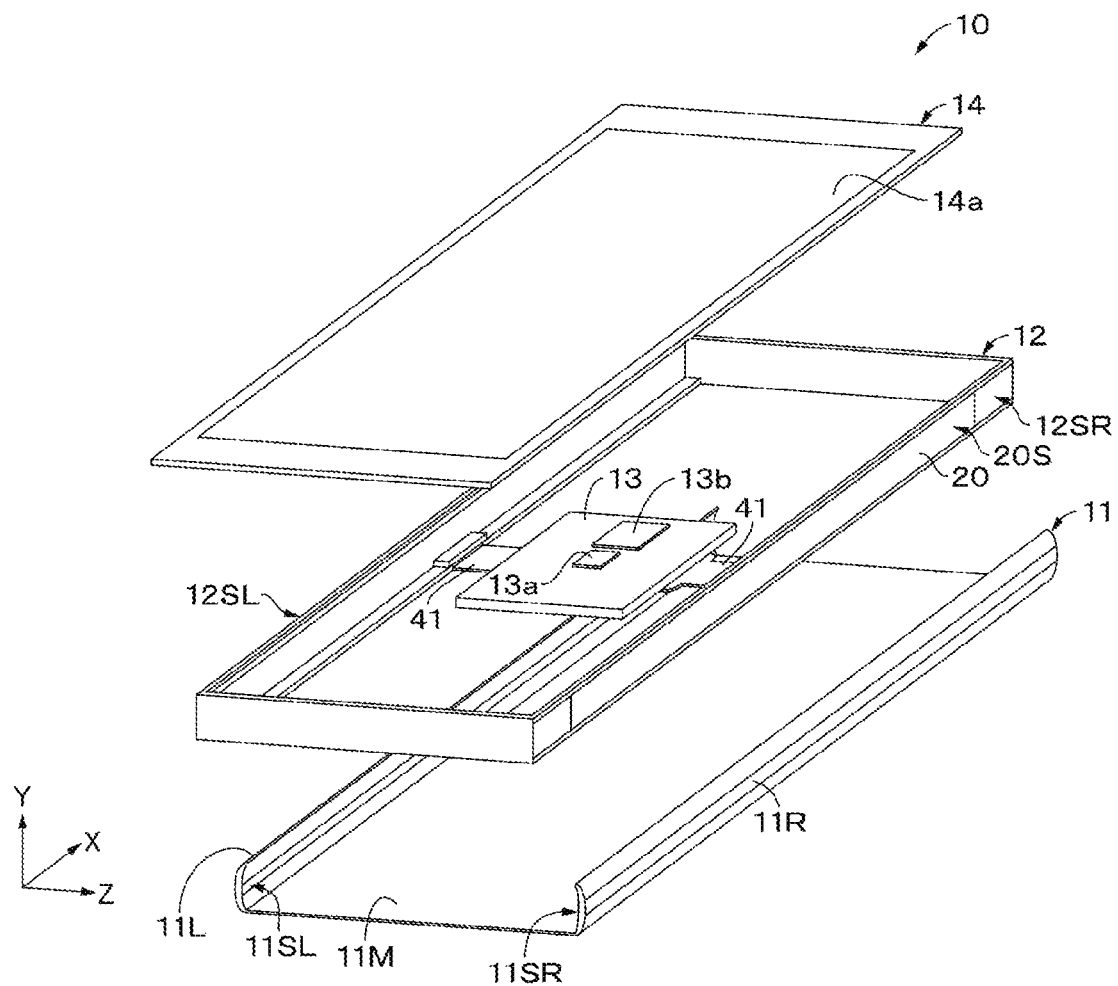
FIG. 2 is an exploded perspective view depicting a configuration of the electronic apparatus according to the embodiment of the present disclosure.

In the following, an electronic apparatus 10 according to an embodiment of the present disclosure is described with reference to FIGS. 1A, 1B, and 2. The electronic apparatus 10 is what is generally called a smartphone and includes a housing 11 as an exterior body, two sensors 20 having a sensing face (first face) 20S and a rear face (second face) on opposite the sensing face, a frame 12 as a support that supports the sensors 20 such that inner side faces 11SR and 11SL of the housing 11 and the sensing faces 20S are opposed to each other, a board 13 arranged in the frame 12, and a front panel 14 provided on the frame 12.

The electronic apparatus 10 is capable of executing (1) a wakeup manipulation, (2) a sliding manipulation, (3) an automatic startup manipulation of a camera application, (4) a detection function of right hand/left hand and so forth by pressing side faces 10SR and 10SL of the electronic apparatus 10 with a finger or the like.

An inputting device includes the housing 11, the sensors 20, and the frame 12. The inputting device may further include the board 13 as occasion demands.

(Housing)

The housing 11 includes a bottom portion 11M in the form of a rectangular plate configuring the rear face of the electronic apparatus 10 and side wall portions 11R and 11L provided on the opposite long sides of the bottom portion 11M. The side wall portions 11R and 11L are configured for pressing a sensing face 20S through an elastic layer 28 when they are pressed toward the sensing face 20S. A projection 11a is provided in the proximity of an end portion of the inner side face 11SR. The projection 11a is configured so as to mesh with a recess 12a provided on a support face 12SR of the frame 12. Also, an inner side face 11SL and a support face 12SL have configurations similar to those of the inner side face 11SR and the support face 12SR, respectively.

The housing 11 includes, for example, a metal, a polymer resin, or a wood. As the metal, for example, aluminum, titanium, zinc, nickel, magnesium, copper, iron and so forth as a simple substance and alloys including two or more of those metals are applicable. As a particular example of such alloys, stainless steel (Stainless Used Steel: SUS), aluminum alloys, magnesium alloys, titanium alloys and so forth are applicable. As the polymer resins, for example, copolymer synthetic resins of acrylonitrile, butadiene, and styrene (ABS resin), polycarbonate (PC) resins, PC-ABS alloy resins and so forth are applicable.

(Frame)

The frame 12 is accommodated between the side wall portions 11R and 11L. If the frame 12 is viewed in plan from a direction perpendicular to the bottom portion 11M, then the frame 12 has a rectangular ring shape slightly smaller than the bottom portion 11M. The frame 12 has the support faces 12SR and 12SL opposing to the inner side faces 11SR and 11SR of the side wall portions 11R and 11L, respectively. A sensor 20 is supported on the support face 12SR such that the inner side face 11SR of the side wall portion 11R and the sensing face 20S are opposed to each other. Similarly, another sensor 20 is supported on the support face 12SL such that the inner side face 11SL of the side wall portion 11L and the sensing face 20S are opposed to each other.

(Board)

The board 13 is a main board of the electronic apparatus 10 and includes a controller ID (Integrated Circuit) (hereinafter simply referred to as an "IC") 13a and a main CPU (Central Processing Unit) (hereinafter simply referred to as a "CPU") 13b. The IC 13a is a control section that controls the two sensors 20 to detect a pressure applied to the respective sensing faces 20S. The CPU 13b is a control section for controlling the entire electronic apparatus 10. For example, the CPU 13b executes various processes on the basis of a signal supplied thereto from the IC 13a.

(Front Panel)

The front panel 14 includes a display device 14a, and a touch panel of the capacitive type is provided on the surface of the display device 14a. The display device 14a displays a screen image on the basis of a video signal or the like supplied from the CPU 13b. As the display device 14a, for example, a liquid crystal display, an electroluminescence (Electro Luminescence: EL) display and so forth are applicable. However, they are not restrictive.

(Sensor)

Figure 3A:
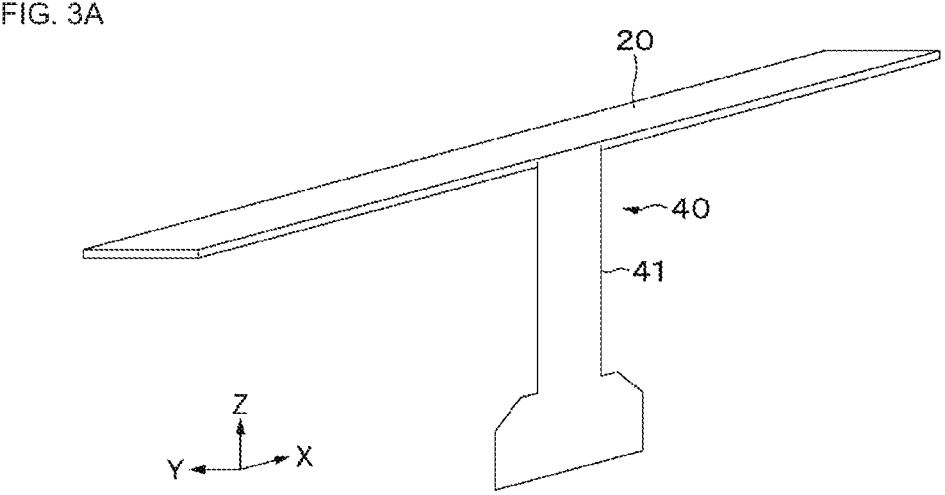
FIG. 3A is a perspective view depicting a shape of a sensor.
Figure 5:
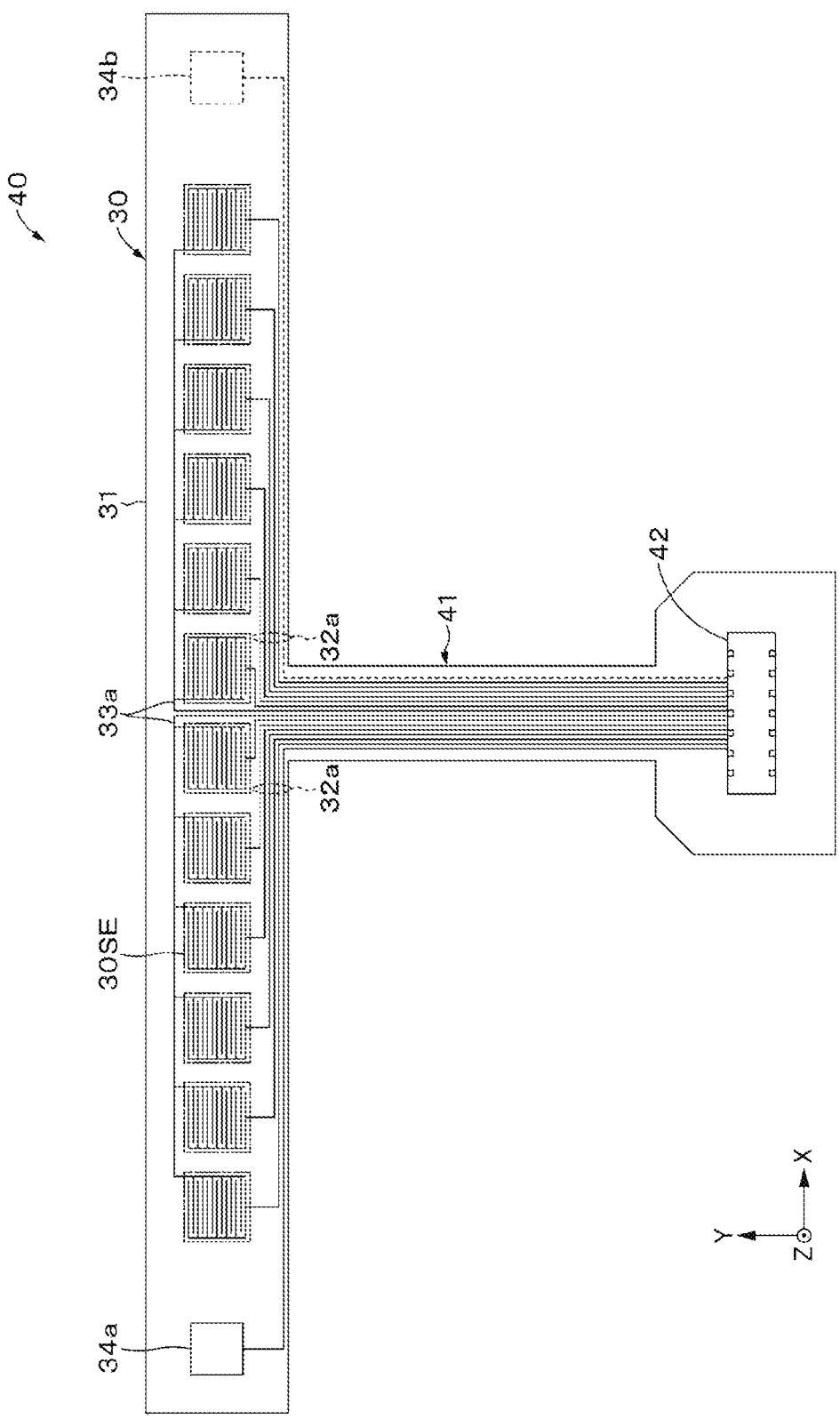
FIG. 5 is a plan view depicting a configuration of a flexible printed board.

The sensor 20 is what is generally called a pressure sensitive sensor and has a form of an elongated rectangular film as depicted in FIG. 3A. Note that it is defined in the present disclosure that the film also includes a sheet. A connection portion 41 is provided so as to extend from the middle of a long side of the sensor 20. More particularly, as depicted in FIG. 5, the sensor 20 includes a sensor electrode layer 30 having a form of an elongated rectangular film, and the connection portion 41 extends from the middle of a long side of the sensor electrode layer 30. The sensor electrode layer 30 and the connection portion 41 are configured integrally by a single flexible printed circuit (Flexible Printed Circuits, hereinafter referred to as an FPC) 40.

Figure 3B:
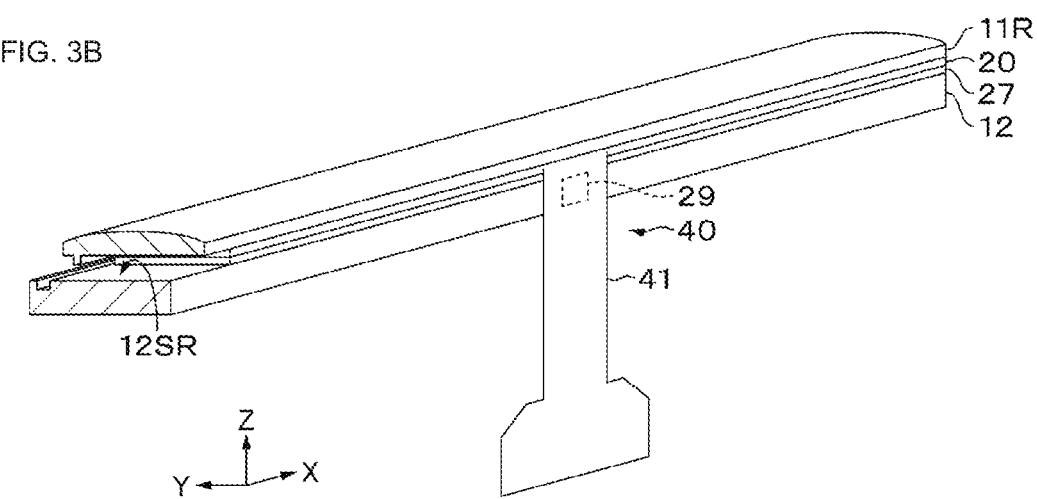
FIG. 3B is a perspective view depicting an arrangement form of the sensor.

The rear face of the sensor 20 on the side wall portion 11R side is pasted to the support face 12SR of the frame 12 by an adhesive layer 27 as depicted in FIG. 3B. Further, if force is applied to the FPC 40, then noise is generated, and therefore, the connection portion 41 is preferably pasted to the frame 12 through an adhesive layer 29. Also, the rear face of the sensor 20 on the side wall portion 11L side is pasted to the support face 12SL similarly to the sensor 20 of the side wall portion 11R described above.

Figure 4:
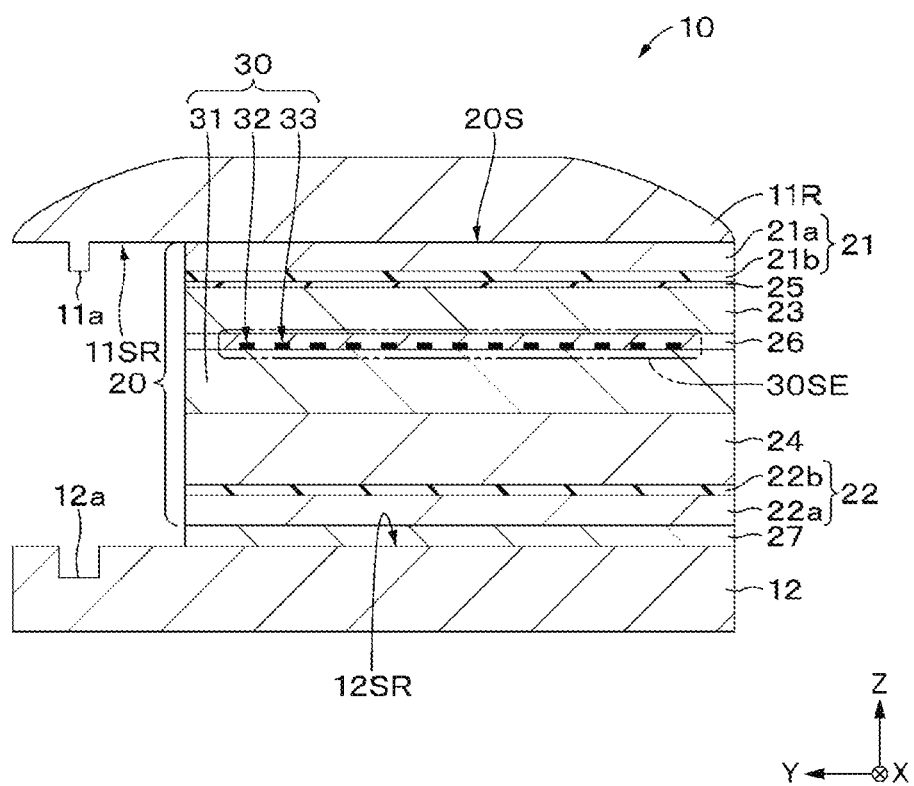
FIG. 4 is a sectional view depicting a configuration of the sensor.

As depicted in FIG. 4, the sensor 20 includes a sensor electrode layer 30 of the capacitive type including a plurality of sensing portions 30SE, electrode substrates 21 and 22, an elastic layer 23, a gap layer 24, and adhesive layers 25 to 27. It is to be noted that, in the present specification, a longitudinal direction of the sensor 20 is referred to as a ±X axis direction and a widthwise direction (lateral direction) is referred to as a ±Y axis direction, and a direction perpendicular to the longitudinal direction and the lateral direction (that is, a direction perpendicular to the sensing face 20S) is referred to as a ±Z axis direction.

The electrode substrate 21 and the sensor electrode layer 30 are arranged such that main surfaces of the electrode substrate 21 and the sensor electrode layer 30 are opposed to each other. The elastic layer 23 is provided between the main surfaces of the electrode substrate 21 and the sensor electrode layer 30. The elastic layer 23 and the electrode substrate 21 are pasted to each other by the adhesive layer 25, and the elastic layer 23 and the sensor electrode layer 30 are pasted to each other by the adhesive layer 26. It is to be noted that, in the case where the elastic layer 23 is made of a sticky material, the adhesive layers 25 and 26 are not required to be provided.

The electrode substrate 22 and the sensor electrode layer 30 are arranged such that the main surfaces of the electrode substrate 22 and the sensor electrode layer 30 are opposed to each other. The gap layer 24 is provided between the main surfaces of the electrode substrate 22 and the sensor electrode layer 30. The electrode substrate 22 and the sensor electrode layer 30 are pasted to each other by the gap layer 24.

(Sensor Electrode)

The sensor electrode layer 30 has a form of an elongated rectangular shape and is part of the FPC 40 as described hereinabove. By forming the sensor electrode layer 30 as part of the FPC 40 in such a manner, the number of parts can be reduced. Further, the impact durability of the connection between the sensor 20 and the board 13 can be improved. As depicted in FIG. 5, the FPC 40 includes the sensor electrode layer 30 and the connection portion 41 extending from the middle of a long side of the sensor electrode layer 30.

Figure 6:
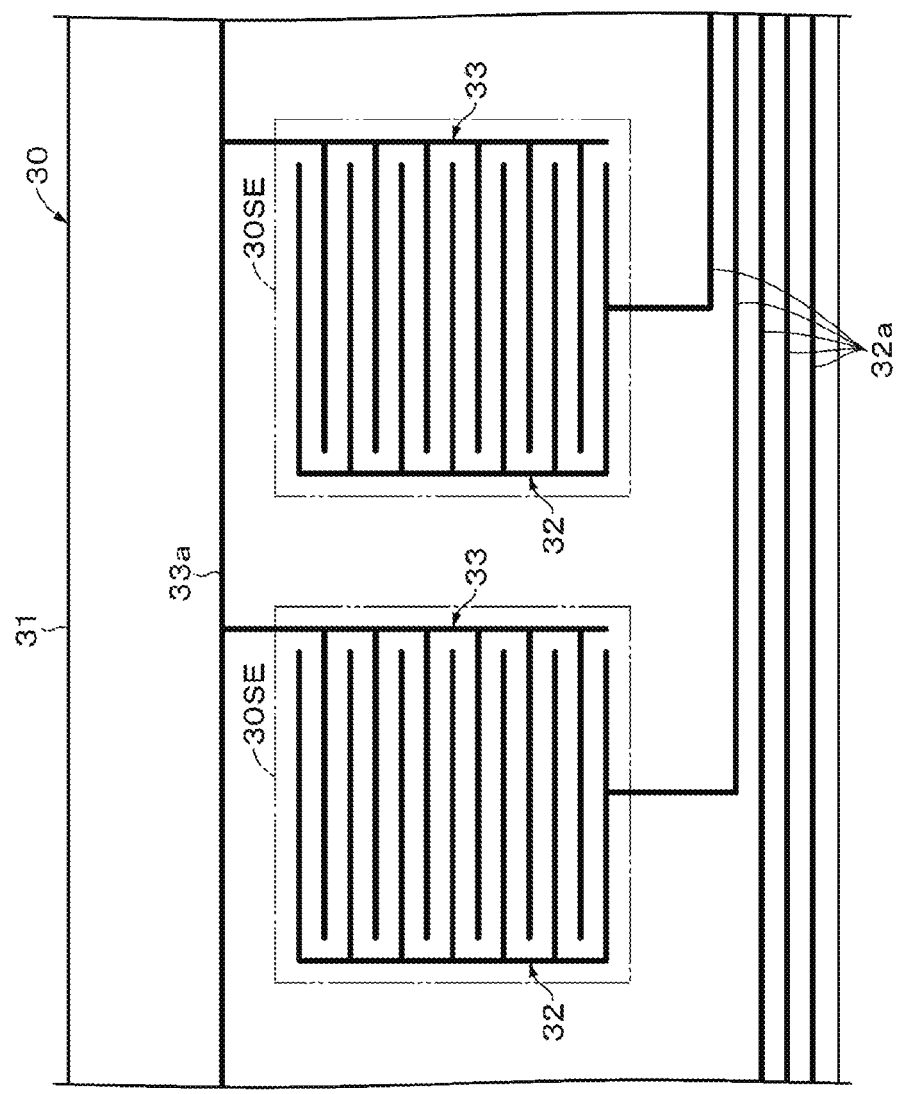
FIG. 6 is a plan view depicting a configuration of a sensing portion.

As depicted in FIG. 6, the sensor electrode layer 30 includes a substrate 31 having flexibility, a plurality of pulse electrodes 32, a plurality of sense electrodes 33, and one ground electrode 34a provided on one of the main surfaces of the substrate 31, and one ground electrode 34b provided on the other main surface of the substrate 31. Each sensing portion 30SE includes a pulse electrode 32 and a sense electrode 33. If the plurality of sensing portions 30SE is viewed in plan from a Z-axis direction, then the plurality of sensing portions 30SE is arranged one-dimensionally at equal distances in the X axis direction so as to form one line. Each sensing portion SE detects capacitance corresponding to a distance between the sensing portion SE and the electrode substrate 21.

The connection portion 41 includes wires 32a and 33a provided one of the main surfaces of the substrate 31 and a connection terminal 42. Each wire 32a electrically connects a pulse electrode 32 and the ground electrode 34a or 34b to the connection terminal 42 provided at an end of the connection portion 41. Each wire 33a electrically connects a sense electrode 33 and the connection terminal 42 provided at an end of the connection portion 41 to each other. The connection terminal 42 is electrically connected to the board 13.

The FPC 40 may further include, on one of the main surfaces of the substrate 31, an insulating layer (not depicted) such as a cover lay film that covers the pulse electrodes 32, the sense electrodes 33, the ground electrode 34a, and the wires 32a and 33a.

The substrate 31 contains a polymer resin and has flexibility. As the polymer resin, for example, polyethylene terephthalate (PET), polyethylene naphthalate (PEN), polycarbonate (PC), acrylic resin (PMMA), polyimide (PI), triacetyl cellulose (TAC), polyester, polyamide (PA), aramid, polyethylene (PE), polyacrylate, polyether sulfone, polysulfone, polypropylene (PP), diacetyl cellulose, polyvinylchloride, epoxy resin, urea resin, urethane resin, melamine resin, cyclic olefin polymer (COP), norbornene-based thermoplastic resin and so forth are applicable. However, these polymer resins are not restrictive.

The pulse and sense electrodes 32 and 33 that are first and second electrodes, respectively, are configured so as to form capacitive coupling. More particularly, the pulse and sense electrodes 32 and 33 have a comb teeth shape and are arranged such that the comb teeth thereof mesh with each other. The sensing portions 30SE include the pulse and sense electrodes 32 and 33 arranged so as to mesh with each other.

The wire 32a is led out from the pulse electrode 32, laid along a peripheral portion of one main surface of the substrate 31, and connected to the connection terminal 42 past the connection portion 41. The wire 33a of the sense electrode 33 is led out from the sense electrode 33, laid along a peripheral portion of the one main surface of the substrate 31, and connected to the connection terminal 42 past the connection portion 41.

(Electrode Substrate)

The electrode substrates 21 and 22 are electrode films having flexibility. The electrode substrate 21 configures the sensing face 20S of the sensor 20 while the electrode substrate 22 configures the rear face of the sensor 20.

The electrode substrate 21 includes a substrate 21a having flexibility and a reference electrode layer (hereinafter referred to as an "REF electrode layer") 21b provided on one of the main surfaces of the substrate 21a. The electrode substrate 21 is arranged on the one main surface side of the sensor electrode layer 30 such that the REF electrode layer 21b is opposed to the one main surface of the sensor electrode layer 30. The electrode substrate 22 includes a substrate 22a having flexibility and a REF electrode layer 22b provided on the one main surface of the substrate 22a. The electrode substrate 22 is arranged on the other main surface side of the sensor electrode layer 30 such that the REF electrode layer 22b thereof is opposed to the other main surface of the sensor electrode layer 30.

The substrates 21a and 22a have a film-like shape. As the material for the electrode substrates 21 and 22, polymer resins similar to those of the substrate 31 described hereinabove can be exemplified. The REF electrode layers 21b and 22b are what are generally called grounding electrodes and have the ground potential. As the shape of the REF electrode layers 21b and 22b, for example, a thin-film shape, a foil shape, a mesh shape and so forth are applicable. However, the shapes are not restrictive.

The REF electrode layers 21b and 22b are sufficient if they have electric conductivity and can be configured using, for example, an inorganic conductive layer containing an inorganic conductive material, an organic conductor layer containing an organic conductive material, an organic-inorganic conductor layer containing both an inorganic conductive material and an organic conductive material and so forth. The inorganic conductive material and the organic conductive material may have a form of grain.

As the inorganic conductive material, for example, metals, metal oxides and so forth are applicable. Here, it is defined that the metals include semi-metals. As the metals, for example, such metals as aluminum, copper, silver, gold, platinum, palladium, nickel, tin, cobalt, rhodium, iridium, iron, ruthenium, osmium, manganese, molybdenum, tungsten, niobium, tantalum, titanium, bismuth, antimony, and lead and alloys including two or more of the metals are applicable. However, they are not restrictive. As the metal oxide, for example, indium tin oxide (ITO), zinc oxide, indium oxide, antimony-doped copper oxide, fluorinated zinc oxide, aluminum-doped zinc oxide, gallium-doped zinc oxide, silicon-doped zinc oxide, zinc oxide-tin oxide, indium oxide-tin oxide, and zinc oxide-indium oxide-magnesium oxide are applicable. However, the metal oxides mentioned are not restrictive.

As the organic conductive material, for example, carbon materials, conductive polymers and so forth are applicable. As the carbon materials, for example, carbon black, carbon fiber, fullerene, graphene, carbon nanotube, carbon micro coil, nanohorn and so forth are applicable. However, the carbon materials mentioned are not restrictive. As the conductive polymers, for example, substituted or unsubstituted polyamine, polypyrrole, polythiophene, or a (co-)polymer composed of one or two selected from them is applicable. However, the conductive polymers mentioned are not restrictive.

The REF electrode layers 21b and 22b may be thin films produced by any of a dry process and a wet process. As the dry process, for example, a sputtering method, an evaporation method and so forth are applicable. However, they are not restrictive.

Since the electrode substrates 21 and 22 are provided on the opposite main surface sides of the sensor electrode layer 30, external noise (external electric field) can be prevented from entering the sensor electrode layer 30 from the opposite main surface sides of the sensor 20. Accordingly, degradation of the detection accuracy or erroneous detection of the sensor 20 by external noise can be suppressed.

(Elastic Layer)

The elastic layer 23 is configured for elastic deformation by a pressure applied to the sensing face 20S. Since the elastic layer 23 is sandwiched between the sensor electrode layer 30 and the electrode substrate 21, the sensitivity and the dynamic range of the sensor 20 can be adjusted. A thickness of the elastic layer 23 is 100 μm or less, and, besides, a weight per unit area of the elastic layer 23 is less than 3 mg/cm$^2$. This makes it possible to obtain good sensitivity.

The upper limit value of the thickness of the elastic layer 23 preferably is, from the point of view of improvement of the sensitivity of the sensor 20, 75 μm or less, more preferably is 50 μm or less, even more preferably is 40 μm or less, and specifically preferably is 25 μm or less.

Although the lower limit value of the thickness of the elastic layer 23 is not specifically restrictive, it preferably is 1 μm or more, more preferably is 3 μm or more, and even more preferably is 5 μm or more. If the thickness of the elastic layer 23 is smaller than 1 μm, then the sensitivity of the sensor 20 is so high that the electronic apparatus 10 can be suppressed from malfunctioning by unintended pressing of the side wall portion 11R or 11L.

The thickness of the elastic layer 23 can be calculated in the following manner. First, the sensor 20 is worked by an FIB (Focused Ion Beam) method or the like to produce a cross section, and a cross section image (hereinafter referred to as a "cross section SEM picture") is captured using a scanning electron microscope (Scanning Electron Microscope: SEM). Then, a point is randomly selected from within the elastic layer 23 in the cross section SEM picture, and the thickness of the elastic layer 23 is measured at the point.

The upper limit value of the weight per unit area of the elastic layer 23 preferably is, from a point of view of improvement of the sensitivity of the sensor 20, 2.5 mg/cm$^2$ or less, more preferably is 1.5 mg/cm$^2$ or less, even more preferably is 1.0 mg/cm$^2$ or less, and specifically preferably is 0.5 mg/cm$^2$ or less.

Although the lower limit value of the weight per unit area of the elastic layer 23 is not restricted specifically, it preferably is 0.1 mg/cm$^2$ or more, more preferably is 0.3 mg/cm$^2$ or more, and even more preferably is 0.5 mg/cm$^2$ or less. If the thickness of the elastic layer 23 is less than 0.1 mg/cm$^2$, then the sensitivity of the sensor 20 is so high that the electronic apparatus 10 can be suppressed from malfunctioning by unintended pressing of the side wall portion 11R or 11L.

The weight per unit area of the elastic layer 23 is calculated in the following manner. First, after the surface of the elastic layer 23 is exposed by exfoliating the electrode substrate 21 from the sensor 20 or by a like manipulation, mass M1 of the sensor 20 is measured in this state. Then, after the elastic layer 23 is removed from the sensor 20 by dissolving the elastic layer 23 in solvent or by like means, mass M2 of the sensor 20 is measured in this state. Finally, the weight per unit area of the elastic layer 23 is calculated by the following expression:

weight per unit area [mg/cm$^2$] of elastic layer 23= (mass M1−mass M2)/(area S of elastic layer 23)

The elastic layer 23 includes a porous layer. Preferably, the porous layer is a fiber layer. The fiber layer is, for example, unwoven fabric or woven fabric. While fiber included in the fiber layer may be nanofiber or may be fiber thicker than nanofiber, from a point of view of improvement of the sensitivity of the sensor 20, preferably, the fiber is nanofiber. While the fiber may contain a polymer resin or may include an inorganic material, from the point of view of improvement of the sensitivity of the sensor 20, preferably, the fiber contains a polymer resin.

The porous layer may be a layer that includes a three-dimensional structure (irregular network structure like that of unwoven fabric) formed from a fibrous structure and has a plurality of gaps (pores) provided therein. Where the porous layer includes a three-dimensional structure, a structure having a high porosity can be produced, and, besides, thinning is facilitated.

A fibrous structure is a fibrous substance having a sufficient length with respect to a fiber diameter (diameter). For example, plural fibrous structures aggregates and overlaps randomly to configure a porous layer. Otherwise, a single fibrous structure may be intertwined at random to form a porous layer. Alternatively, a porous layer by a single fibrous structure and another porous layer by a plurality of fibrous structures may exist in a mixed manner.

The fibrous structure extends, for example, linearly. The shape of the fibrous structure may be any shape and may be, for example, curled or intermediately bent. Otherwise, the fibrous structure may be intermediately branched.

A minimum fiber diameter of the fibrous structure preferably is 500 nm or less, and more preferably is 300 nm or less. While the average fiber diameter preferably is, for example, equal to or greater than 0.1 μm but equal to or smaller than 10 μm, it may be out of the range. As the average fiber diameter decreases, the pore diameter of pores increases. The average fiber diameter can be measured by microscope observation using, for example, a scanning electron microscope. The fibrous structure may have any average length. The fibrous structure is formed, for example, by a phase separation method, a phase inversion method, an electrostatic (electric field) spinning method, a melt spinning method, a wet spinning method, a dry spinning method, a gel spinning method, a sol-gel method, or a spray coating method. By using any of such methods as just described, a fibrous structure having a sufficient length with respect to a fiber diameter can be formed easily and stably.

The fibrous structure is preferably formed at least from one of a polymer material and an inorganic material and is specifically preferably formed from nanofiber. Here, the nanofiber is a fibrous substance having a fiber diameter equal to or greater than 1 nm but equal to or smaller than 1000 nm and having a length equal to or greater than 100 times the fiber diameter. By using such nanofiber as a fibrous structure, the porosity becomes high and thinning becomes possible. The fibrous structure formed from nanofiber is preferably formed by the electrostatic spinning method. By using the electrostatic spinning method, a fiber structure having a small fiber diameter can be formed easily and stably.

(Gap Layer)

The gap layer 24 separates the electrode substrate 22 and the sensor electrode layer 30 from each other, and the initial capacitance of the sensor 20 is adjusted by the thickness of the gap layer 24. The gap layer 24 may be configured for elastic deformation by a pressure applied to the sensing face 20S or may not be configured for elastic deformation.

The gap layer 24 contains an adhesive having an insulating property and also has a function as an adhesive layer. The gap layer 24 includes, for example, an adhesive layer of a single layer or a laminate (for example, a double-sided adhesive film) having an adhesive layer on the opposite faces of a substrate.

As the adhesive contained in the adhesive layer, for example, at least one of an acrylic adhesive, a silicone-based adhesive, or an urethane-based adhesive can be used. It is to be noted that, in the present disclosure, it is defined that sticky (pressure sensitive adhesion) is a kind of adhesion (adhesion). According to this definition, a sticky layer is regarded as a kind of adhesive layer.

(Adhesive Layer)

The adhesive layers 25 to 27 include, for example, an adhesive having an insulating property or a double-sided adhesive film. As the adhesive, adhesives similar to those of the gap layer 24 described hereinabove can be exemplified.

Circuit Configuration of Electronic Apparatus

Figure 7:
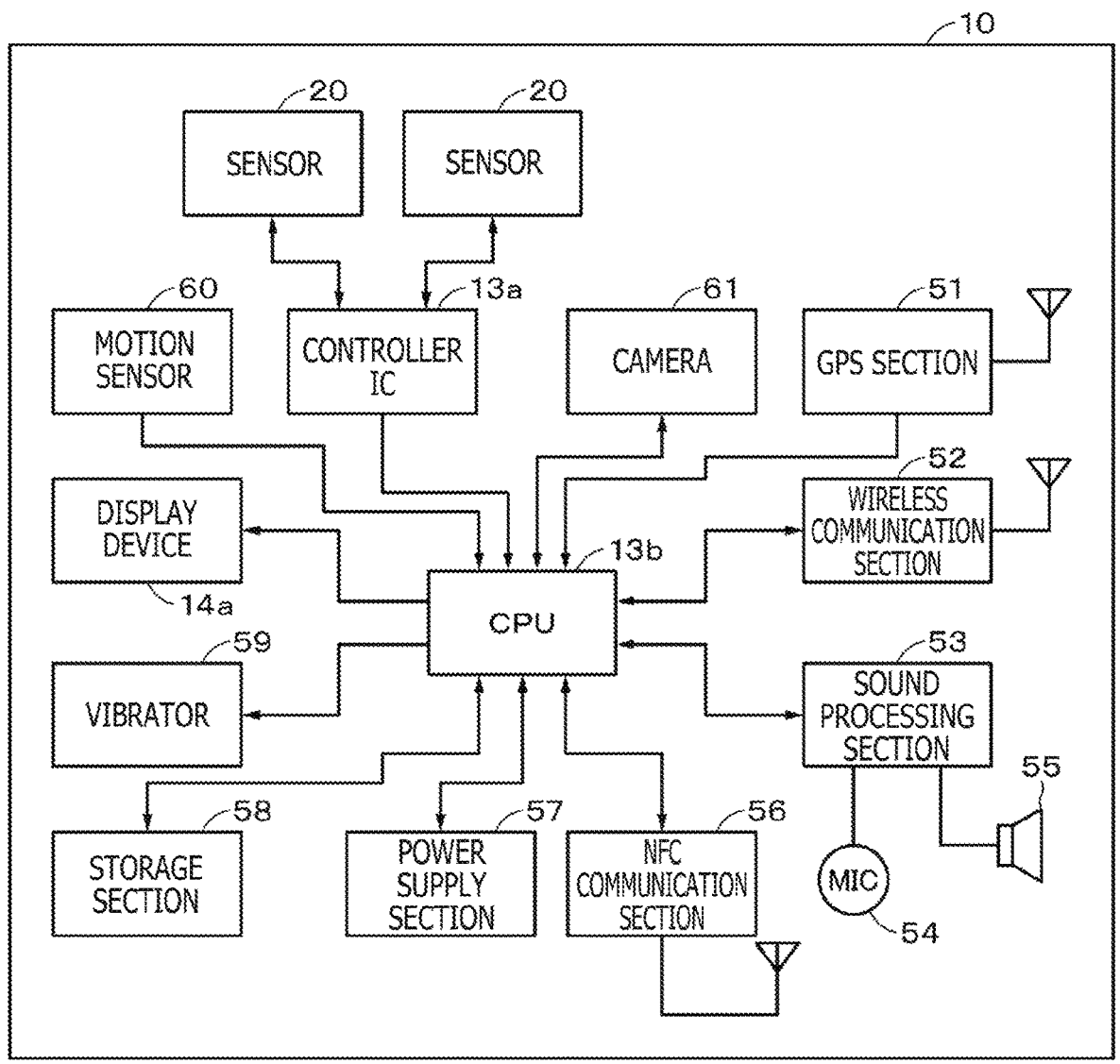
FIG. 7 is a block diagram depicting a circuit configuration of the electronic apparatus according to the embodiment of the present disclosure.

As depicted in FIG. 7, the electronic apparatus 10 includes the two sensors 20, the CPU 13b, the IC 13a, a GPS section 51, a wireless communication section 52, a sound processing section 53, a microphone 54, a speaker 55, an NFC communication section 56, a power supply section 57, a storage section 58, a vibrator 59, the display device 14a, a motion sensor 60, and a camera 61.

The GPS section 51 is a position measurement section that receives radio waves from satellites of a system called GPS (Global Positioning System) to perform position measurement of a current position. The wireless communication section 52 performs near field wireless communication with another terminal in accordance with a standard, for example, of Bluetooth (registered trademark). The NFC communication section 56 performs wireless communication with a neighboring reader/writer in accordance with the standard of NFC (Near Field Communication). Data obtained by the GPS section 51, the wireless communication section 52, and the NFC communication section 56 is supplied to the CPU 13b.

To the sound processing section 53, the microphone 54 and the speaker 55 are connected, and the sound processing section 53 performs a process for communication with a party connected by wireless communication by the wireless communication section 52. Further, the sound processing section 53 can also perform a process for a sound inputting operation.

The power supply section 57 supplies power to the CPU 13b, the display device 14a and so forth provided in the electronic apparatus 10. The power supply section 57 includes a secondary battery such as a lithium ion secondary battery, a charge/discharge controlling circuit for controlling charge/discharge of the secondary battery and so forth. It is to be noted that, though not depicted in FIG. 7, the electronic apparatus 10 has terminals for charging the secondary battery.

The storage section 58 is a RAM (Random Access Memory) and so forth and stores an OS (Operating System), an application, various kinds of data of a moving picture, an image, music, a document and so forth.

The vibrator 59 is a member for causing the electronic apparatus 10 to vibrate. For example, the electronic apparatus 10 issues notification of an incoming call, reception of an electronic mail or the like by driving the vibrator 59 and vibrating the electronic apparatus 10.

The display device 14a displays various screen images on the basis of a video signal and so forth supplied from the CPU 13b. Further, the display device 14a supplies a signal according to a touch manipulation with the display face of the display device 14a to the CPU 13b.

The motion sensor 60 detects a motion of a user who holds the electronic apparatus 10. As the motion sensor 60, an acceleration sensor, a gyro sensor, an electronic compass, a barometric pressure sensor and so forth are used.

The camera 61 includes a lens group and an imaging element such as a CMOS (Complementary Metal Oxide Semiconductor) imaging element and captures an image of a still picture, a moving picture or the like under the control of the CPU 13b. The captured still picture, moving picture or the like is stored into the storage section 58.

The sensor 20 detects capacitance according to pressing force applied to the sensing face 20S and outputs an output signal according to the capacitance to the IC 13a.

The IC 13a has stored therein firmware for controlling the sensor 20 and detects a change (pressure) of the capacitance of each sensing portion 30SE the sensor 20 has, and to output a signal according to a result of the detection to the CPU 13b.

The CPU 13b executes various processes based on a signal supplied from the IC 13a. Further, the CPU 13b processes data supplied from the GPS section 51, the wireless communication section 52, the NFC communication section 56, the motion sensor 60 and so forth.

Manipulation Regions of Electronic Apparatus

Figure 8:
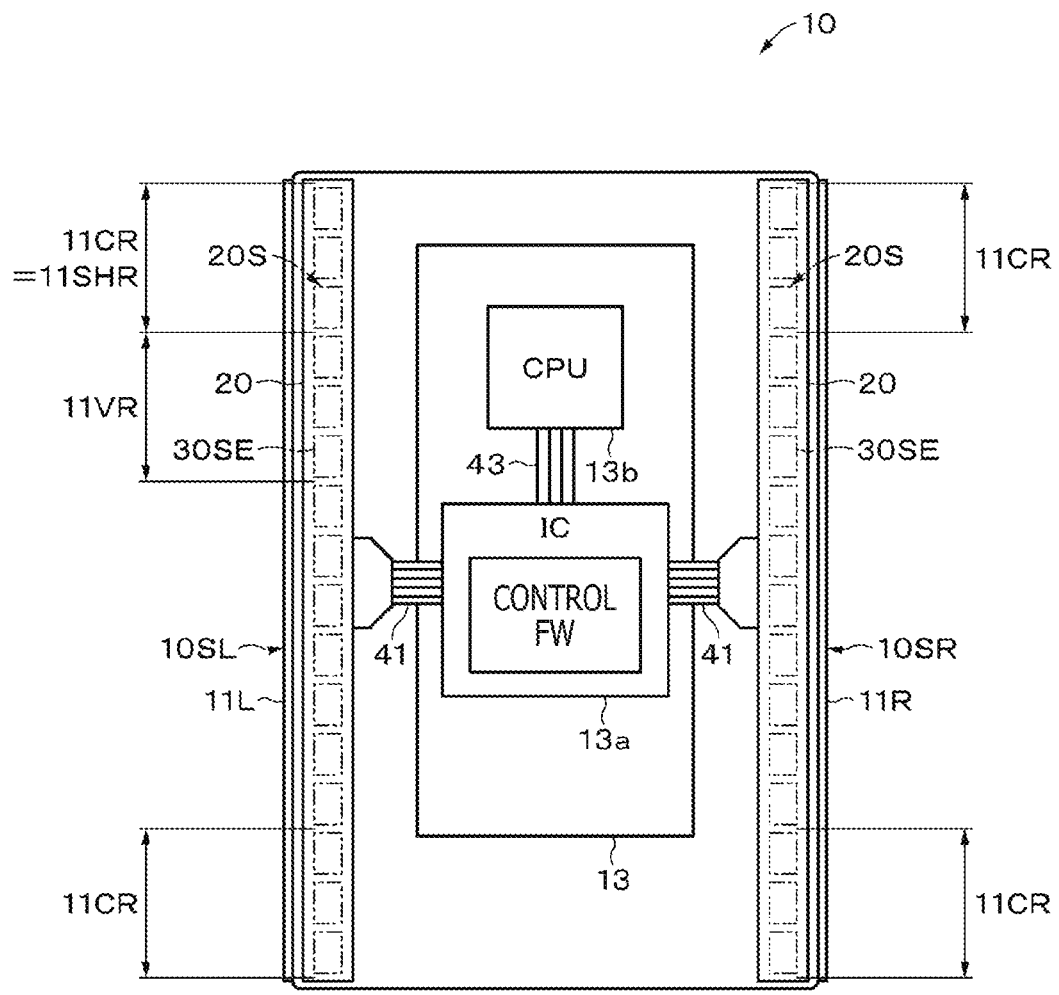
FIG. 8 is a schematic view illustrating regions of the electronic apparatus according to the embodiment of the present disclosure.

As depicted in FIG. 8, the sensor 20 is connected to the IC 13a through the connection portion 41. The IC 13a and the CPU 13b are connected to each other by a bus 43 such as an I²C bus. Although, in FIG. 8, a configuration that the sensor 20 includes 16 sensing portions 30SE is illustrated, the number of sensing portions 30SE is not limited to this and can be set suitably according to a desired characteristic of the sensor 20. Further, although the sensor 20 is depicted such that the sensing face 20S extends in parallel to the XZ plane in order to facilitate understanding of the configuration of the sensor 20, actually the sensing face 20S is maintained in parallel to the XY plane.

(Sound Volume Adjustment Region)

The electronic apparatus 10 has a sound volume adjustment region 11VR for adjusting the sound volume on the side face 10SL. By slidably moving a finger in an upper direction (first direction) along the sound volume adjustment region 11VR, it is possible to increase the sound volume, and by slidably moving a finger in a downward direction (second direction) along the sound volume adjustment region 11VR, it is possible to decrease the sound volume. Here, it is assumed that the upper direction signifies the +X axis direction and the downward direction signifies the −X direction. It is to be noted that the sound volume adjustment region 11VR is an example of a sliding manipulation region.

It is to be noted that the position of the sound volume adjustment region 11VR depicted in FIG. 8 is an example, and the position of the sound volume adjustment region 11VR is not limited to this. Further, while, in FIG. 8, the electronic apparatus 10 is configured such that the sound volume adjustment region 11VR is provided only on the side face 10SL, the sound volume adjustment region 11VR may be provided otherwise on both of the side faces 10SR and 10SL.

The sound volume adjustment region 11VR has two or more sensing portions 30SE. The IC 13a decides, on the basis of signals supplied from the sensing portions 30SE the sound volume adjustment region 11VR has, whether or not a sliding manipulation has been performed in the upward direction or the downward direction. In the case where it is decided that the sliding manipulation has been performed in the upper direction or the downward direction, the IC 13a supplies a signal for the notification that a sliding manipulation has been performed in the upward direction or the downward direction to the CPU 13b.

(Camera Holding Region)

The electronic apparatus 10 has a camera holding region 11CR at the opposite ends of each of the side faces 10SR and 10SL. If a user holds the four camera holding regions 11CR with its fingers, then the camera application starts up automatically. Each camera holding region 11CR has at least one sensing portion 30SE.

The IC 13a decides, on the basis of signals supplied from the sensing portions 30SE each camera holding region 11CR has, whether or not the user holds the camera holding regions 11CR with its fingers. In the case where it is decided that the four camera holding regions 11CR are held by fingers, the IC 13a supplies a signal for requesting startup of the camera application to the CPU 13b.

(Shutter Manipulation Region)

The electronic apparatus 10 has a shutter manipulation region 11SHR at one end portion in the upper direction of the side face 10SL. It is to be noted that, although FIG. 8 depicts a case in which the shutter manipulation region 11SHR and one of the four camera holding region 11CR are the same region, they may otherwise be regions different from each other.

The IC 13a decides, on the basis of signals supplied from the sensing portions 30SE the shutter manipulation region 11SHR has, whether or not the shutter manipulation region 11SHR is pressed with a finger. In the case where it is decided that the shutter manipulation region 11SHR is held with a finger, the IC 13a supplies a signal for requesting for a shutter manipulation (that is, a fetching manipulation of an image) to the CPU 13b.

Operation of Sensor

Now, operation of the sensor 20 according to one embodiment of the present disclosure is described. If the IC 13a applies a voltage between the pulse electrode 32 and the sense electrode 33, then electric field lines (capacitive coupling) are formed between the pulse electrode 32 and the sense electrode 33.

If the sensing face 20S of the sensor 20 is pressed, then the elastic layer 23 is elastically deformed, whereupon the electrode substrate 21 is deflected toward the sensor electrode layer 30. Consequently, the electrode substrate 21 and the sensor electrode layer 30 come closer and part of the electric field lines between the pulse electrode 32 and the sense electrode 33 flows to the electrode substrates 21 and 22 to thereby change the capacitance of the sensing portions 30SE. On the basis of the change of the capacitance, the IC 13a detects the pressure applied to the one main surface of the sensor 20 and outputs a result of the detection to the CPU 13b.

It is to be noted that, in the case where the gap layer 24 is configured for elastic deformation by pressure applied to the sensing face 20S, the sensor 20 operates in the following manner. In particular, if the sensing face 20S of the sensor 20 is pressed, then the elastic layer 23 is elastically deformed to deflect the electrode substrate 21 toward the sensor electrode layer 30 and deflect the sensor electrode layer 30 toward the electrode substrate 22. Consequently, the electrode substrate 21 and the sensor electrode layer 30 come closer and the sensor electrode layer 30 and electrode substrate 22 come closer, whereupon part of the electric field lines between the pulse electrode 32 and the sense electrode 33 flow to the electrode substrates 21 and 22 to thereby change the capacitance of the sensing portions 30SE.

Operation of Electronic Apparatus

Now, operation of the electronic apparatus 10 upon (1) a wakeup manipulation, (2) a sliding manipulation, (3) an automatic startup manipulation of a camera application, and (4) detection of right hand/left hand is described sequentially.

(1) Wakeup Manipulation

The wakeup manipulation returns, in response to gripping of the electronic apparatus 10 in a sleeping mode by its user, the CPU 13b from the sleeping mode to drive the display device 14a. As a particular example of the wakeup manipulation, an example in which the user picks up the electronic apparatus 10 in the sleeping mode placed on a desk and grips the electronic apparatus 10 to cause a screen image of the display device 14a to be displayed is applicable.

Figure 9:
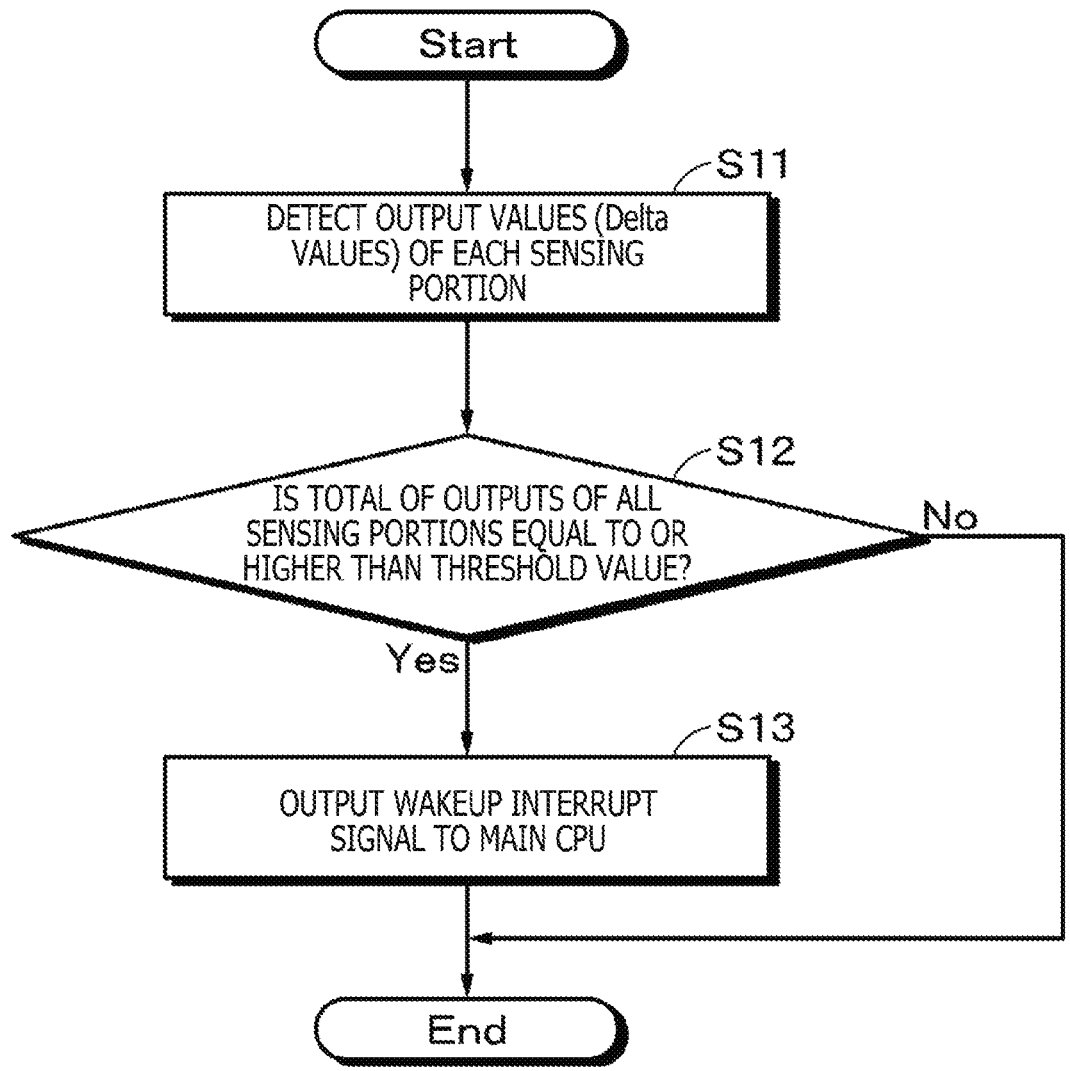
FIG. 9 is a flow chart illustrating operation of the electronic apparatus at a time of a wakeup manipulation.

In the following, operation of the electronic apparatus 10 at a time of a wakeup manipulation is described with reference to FIG. 9. Here, it is assumed that, before step S11, the CPU 13b is in the sleeping mode and the processing depicted in FIG. 9 is executed, for example, in one frame. It is to be noted that the frame signifies a series of processes or a period of the processes when a scanning operation is performed for the sensor 20 to which the IC 13a is connected and a pressure distribution (capacitance distribution) is obtained through signal processing, whereafter the inputting manipulation performed by the user is interpreted on the basis of the resulting pressure distribution (in some cases, together with a chronological pressure distribution change among plural frames in the past) and, as occasion demands, the inputting manipulation substance of the user is outputted to an upper controlling section (here, the CPU 13b). Normally, the IC 13a repeats this frame processing after every fixed period of time determined in advance to interpret an inputting manipulation of the user and outputs a result of the interpretation to the CPU 13b.

First, in step S11, the IC 13a detects an output value (delta value) of each sensing portion 30SE. Then, in step S12, the IC 13a decides whether or not the total of output values of all sensing portions 30SE is equal to or higher than a threshold value.

In the case where it is decided in step S12 that the total of output values of all sensing portions 30SE is equal to or higher than the threshold value, the IC 13a outputs a wakeup interrupt signal to the CPU 13b in step S13. The wakeup interrupt signal is a signal for causing the CPU 13b to execute a wakeup function, and when the wakeup interrupt signal is supplied from the IC 13a to the CPU 13b, the CPU 13b wakes up from the sleeping mode and returns to an ordinary startup state. On the other hand, in the case where it is decided in step S12 that the total of output values of all sensing portions 30SE is not equal to or higher than the threshold value, the processing is ended.

(2) Sliding Manipulation

The sliding manipulation is a manipulation for adjusting the sound volume of the electronic apparatus 10 when the user slidably moves with its fingers the sound volume adjustment region 11VR provided on the side face 10SL in the upward or downward direction.

Figure 10:
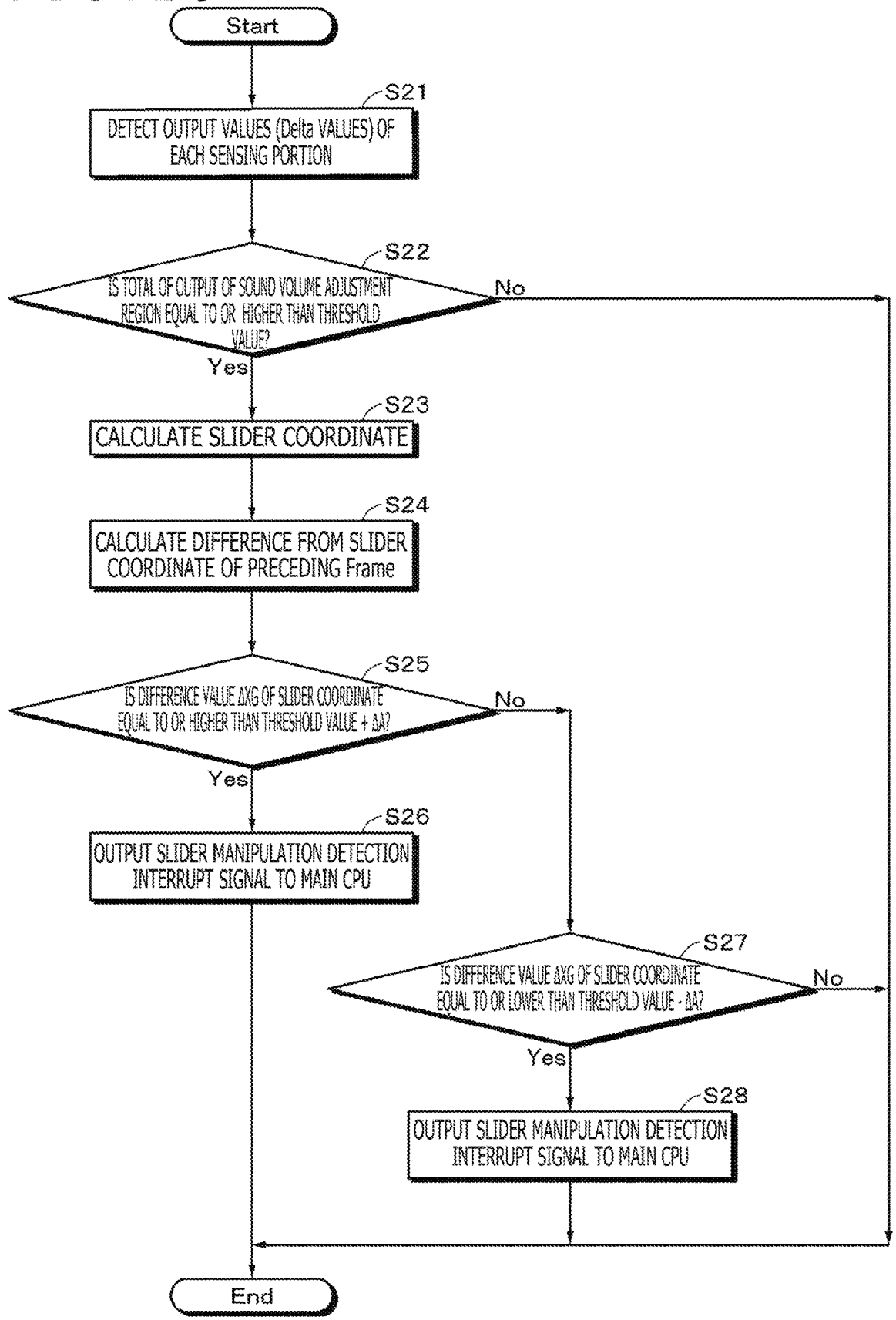
FIG. 10 is a flow chart illustrating operation of the electronic apparatus at a time of a sliding manipulation.

In the following, operation of the electronic apparatus 10 at a time of a sliding manipulation is described with reference to FIG. 10. Here, the sliding manipulation is a manipulation that can be performed, for example, in a state in which a home screen image is displayed, and it is assumed that the processing depicted in FIG. 10 is executed, for example, within one frame.

First, in step S21, the IC 13a detects an output value (delta value) of each sensing portion 30SE. Then, in step S22, the IC 13a decides whether or not the total of output values of all sensing portions 30SE included in the sound volume adjustment region 11VR is equal to or higher than a threshold value.

In the case where it is decided in step S22 that the total of output values of all sensing portions 30SE included in the sound volume adjustment region 11VR is equal to or higher than the threshold value, in step S23, the IC 13a calculates a gravity center coordinate $X_G$ of a slidably moving finger (hereinafter referred to as a "slider coordinate $X_G$"). In particular, the gravity center value of output values of the sensing portions 30SE (a plurality of consecutive sensing portions 30SE) included in the sound volume adjustment region 11VR is calculated using the expression given below. On the other hand, in the case where it is decided in step S22 that the total of output values of all sensing portions 30SE included in the sound volume adjustment region 11VR is not equal to or higher than the threshold value, the processing is ended.

$$x_G = \frac{\sum_{i=1}^{n} m_i x_i}{\sum_{i=1}^{n} m_i}$$ [Math. 1]

(where $m_i$: output value (delta value) of the ith sensing portion 30SE in the sound volume adjustment region 11VR, and $x_i$: position at which the ith sensing portion 30SE in the sound volume adjustment region 11VR is placed)

Note that it is assumed that the number of sensing portions 30SE increases from one end to the other end in the longitudinal direction of the side face 10SL (that is, toward the +X axis direction). Further, the origin of the coordinate $x_i$ is the middle position of the sound volume adjustment region 11VR in the longitudinal direction of the sensing portions 30SE (that is, in the +X axis direction).

Then, in step S24, the IC 13a calculates the difference value $\Delta X_G$ between the slider coordinates $X_G$ calculated in the preceding frame and the slider coordinate $X_G$ calculated in the current frame (=(slider coordinate $X_G$ calculated in current frame)−(slider coordinate $X_G$ calculated in preceding frame)). Then, in step S25, the IC 13a decides whether or not the difference value between the slider coordinates $X_G$ is equal to or higher than a threshold value +ΔA.

In the case where it is decided in step S24 that the difference value between the slider coordinates $X_G$ is equal to or higher than the threshold value +ΔA, the IC 13a outputs a slider manipulation detection interrupt signal to the CPU 13b in step S26.

On the other hand, in the case where it is decided in step S24 that the difference value between the slider coordinates $X_G$ is not equal to or higher than the threshold value +ΔA, the IC 13a decides in step S27 whether or not the difference value between the slider coordinates $X_G$ is equal to or lower than a threshold value −ΔA.

In the case where it is decided in step S27 that the difference value between the slider coordinates $X_G$ is equal to or lower than the threshold value −ΔA, the IC 13a outputs a slider manipulation detection interrupt signal to the CPU 13b in step S28. On the other hand, in the case where it is decided in step S27 that the difference value between the slider coordinates $X_G$ is not equal to or lower than the threshold value −ΔA, the processing is ended.

Here, the slider manipulation detection interrupt signal is a signal for notifying the CPU 13b of detection of a sliding manipulation and a direction of the sliding manipulation, and if the slider manipulation detection interrupt signal is supplied from the IC 13a to the CPU 13b, then the CPU 13b adjusts the sound volume according to the direction of the sliding manipulation. In particular, in the case where the direction of the sliding manipulation is an upward direction (that is, in the case where the difference value between the slider coordinates $X_G$ is equal to or higher than the threshold value ΔA), the CPU 13b controls the sound volume adjustment such that the sound volume is increased. On the other hand, in the case where the direction of the sliding manipulation is a downward direction (that is, in the case where the difference value between the slider coordinates $X_G$ is equal to or lower than the threshold value −ΔA), the CPU 13b controls the sound volume adjustment such that the sound volume is decreased.

(3) Automatic Startup Manipulation of Camera Application

An automatic startup manipulation of the camera application is a manipulation for automatically starting up the camera application in response to holding of the four camera holding regions 11CR provided on the side faces 10SR and 10SL with fingers of the user.

Figure 11:
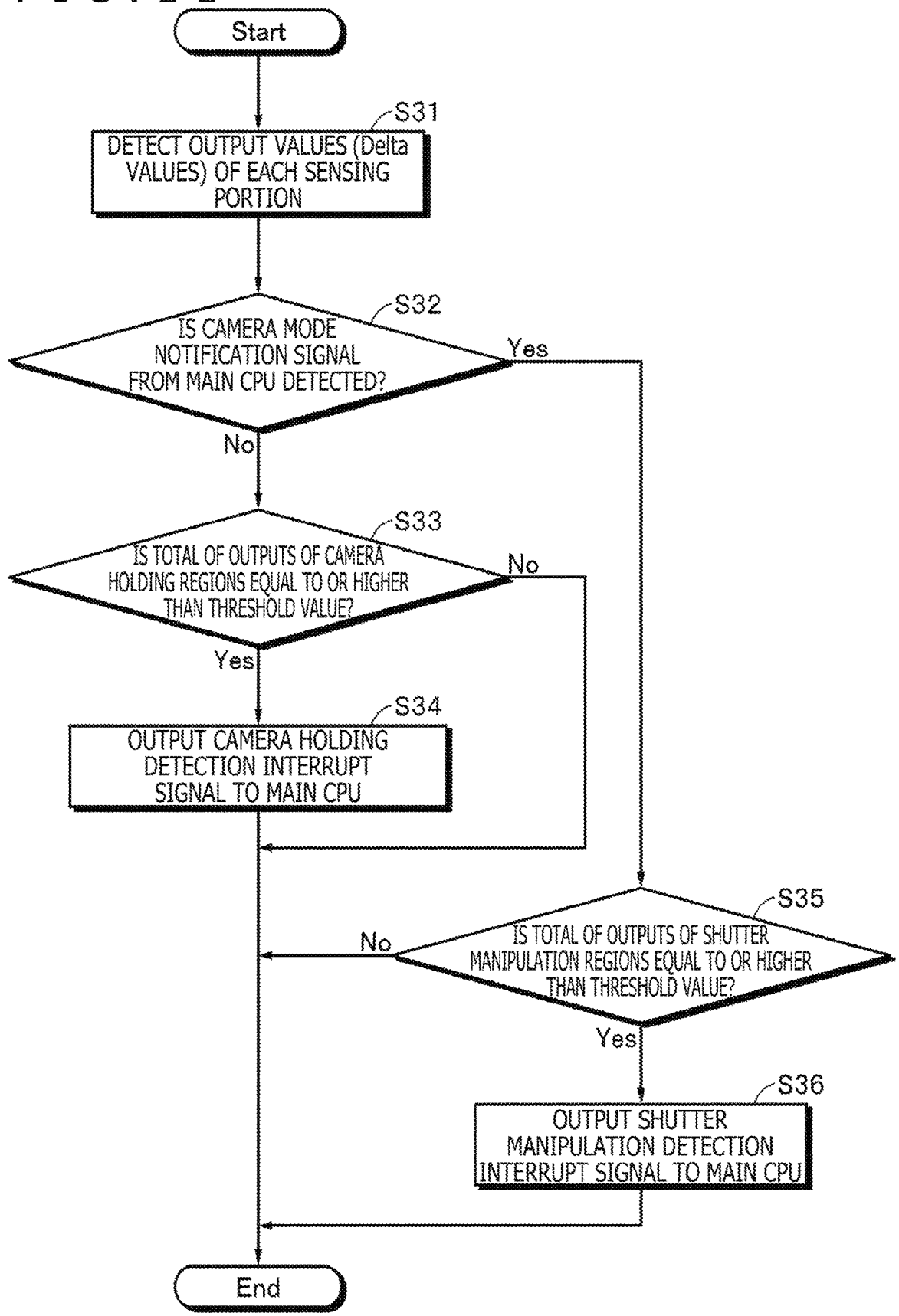
FIG. 11 is a flow chart illustrating operation of the electronic apparatus at a time of an automatic startup manipulation of a camera application.

In the following, referring to FIG. 11, operation of the electronic apparatus 10 at a time of an automatic startup manipulation of the camera application is described. Here it is assumed that the automatic startup manipulation of the camera application is a manipulation that can be performed, for example, in a state in which a home screen image is displayed, and the processing depicted in FIG. 11 is executed, for example, within one frame.

First, in step S31, the IC 13a detects an output value (delta value) of each sensing portion 30SE. At this time, although output values of all sensing portions 30SE of the sensor 20 may be detected, otherwise, only output values of the sensing portions 30SE included in the four camera holding regions 11CR may be detected.

Then, in step S32, the IC 13a decides whether or not a signal for the notification of a camera mode (hereinafter referred to as a "camera mode notification signal") is supplied from the CPU 13b. In the case where it is decided in step S32 that the camera mode notification is not supplied from the CPU 13b, the IC 13a decides in step S33 whether or not the total value of the outputs of the sensing portions 30SE included in the four camera holding regions 11CR is equal to or higher than a threshold value.

In the case where it is decided in step S33 that the total value of the outputs of the four camera holding regions 11CR is equal to or higher than the threshold value, the IC 13a outputs a camera holding manipulation detection interrupt signal to the CPU 13b in step S34. The camera holding manipulation detection interrupt signal is a signal for notifying the CPU 13*b* of startup of the camera application, and if the camera holding manipulation detection interrupt signal is supplied from the IC 13*a* to the CPU 13*b*, then the CPU 13*b* starts up the camera application. On the other hand, in the case where it is decided that the total value of the outputs of the four camera holding regions 11CR is not equal to or higher than the threshold value, then the processing is ended.

In the case where it is decided in step S32 that a camera mode notification signal is supplied from the CPU 13*b*, the IC 13*a* decides in step S35 whether or not the total value of outputs of the sensing portions 30SE included in the shutter manipulation region 11SHR is equal to or higher than a threshold value. It is to be noted that, in the case where the number of the sensing portions 30SE included in the shutter manipulation region 11SHR is only one, the IC 13*a* decides whether or not the output of the sensing portions 30SE is equal to or higher than the threshold value.

In the case where it is decided in step S35 that the total value of outputs of the sensing portions 30SE included in the shutter manipulation region 11SHR is equal to or higher than the threshold value, the IC 13*a* outputs a shutter manipulation detection interrupt signal to the CPU 13*b* in step S36. The shutter manipulation detection interrupt signal is a signal for requesting the CPU 13*b* for a shutter manipulation (that is, an image fetching manipulation), and if the shutter manipulation detection interrupt signal is supplied from the IC 13*a* to the CPU 13*b*, then the CPU 13*b* fetches the image and stores the image into the storage section 58. On the other hand, in the case where it is decided in step S35 that the total value of outputs of the sensing portions 30SE included in the shutter manipulation region 11SHR is not equal to or higher than the threshold value, the processing is ended.

It is to be noted that the electronic apparatus 10 may be configured such that also focus adjustment can be performed through the shutter manipulation region 11SHR. For example, if the shutter manipulation region 11SHR is half depressed, then the focus adjustment may be performed. In particular, in the case where the IC 13*a* decides that the total value of outputs of the sensing portions 30SE is equal to or higher than the first threshold value but is lower than the second threshold value, the IC 13*a* outputs a focus adjustment detection interrupt signal to the CPU 13*b*. The focus adjustment detection interrupt signal is a signal for requesting the CPU 13*b* for focus adjustment of the camera 61, and if the focus adjustment detection interrupt signal is supplied from the IC 13*a* to the CPU 13*b*, then the CPU 13*b* adjusts the focus of the camera 61. In the case where the IC 13*a* detects that the total value is equal to or higher than the second threshold value, it outputs a shutter manipulation detection interrupt signal to the CPU 13*b*.

(4) Detection Function of Right Hand/Left Hand

A detection function of the right hand/left hand is a function of the IC 13*a* of deciding with which one of the right hand and the left hand the user holds the electronic apparatus 10 and automatically changing the screen image display (for example, an application display, a manipulation display or the like) in response to the hand by which the electronic apparatus 10 is held. In particular, in the case where it is decided that the user holds the electronic apparatus 10 with the right hand, a screen image for the right hand is displayed, but in the case where it is decided that the user holds the electronic apparatus 10 with the left hand, a screen image for the left hand is displayed.

For example, in the case of an application display, the IC 13*a* automatically changes the screen image display in the following manner. In particular, in the case where the IC 13*a* decides that the user holds the electronic apparatus 10 with the right hand, menu items are aligned in a range within which the thumb of the right hand can easily reach them or the menu is displayed in a displaced relation to the side face 10SR side on which the thumb of the right hand is positioned from the position of the center of the screen. On the other hand, in the case where the IC 13*a* decides that the electronic apparatus 10 is held with the left hand, menu items are aligned within a range within which the thumb of the left hand can easily reach them or the menu is displayed in a displaced relation to the side face 10SL on which the thumb of the left hand is positioned from the position of the center of the screen.

Figure 12:
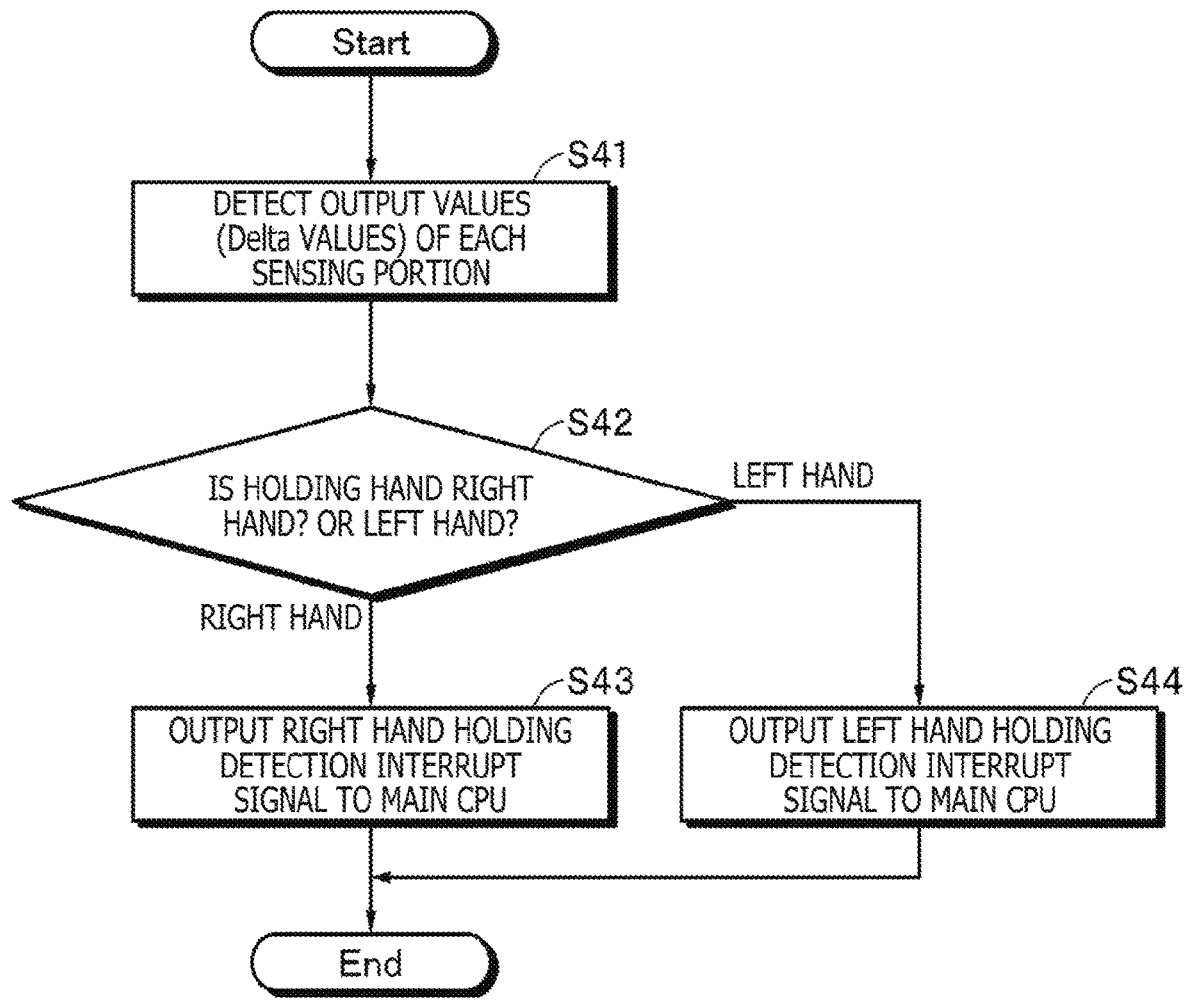
FIG. 12 is a flow chart illustrating operation of the electronic apparatus at a time of detection of right hand/left hand.

In the following, operation of the electronic apparatus 10 by the right hand/left hand detection function is described with reference to FIG. 12. Here, it is assumed that the right hand/left hand detection function is a manipulation that can be performed in a state in which a home screen image, a menu screen image or the like is displayed, and the processing depicted in FIG. 12 is executed, for example, for one frame.

Figure 13:
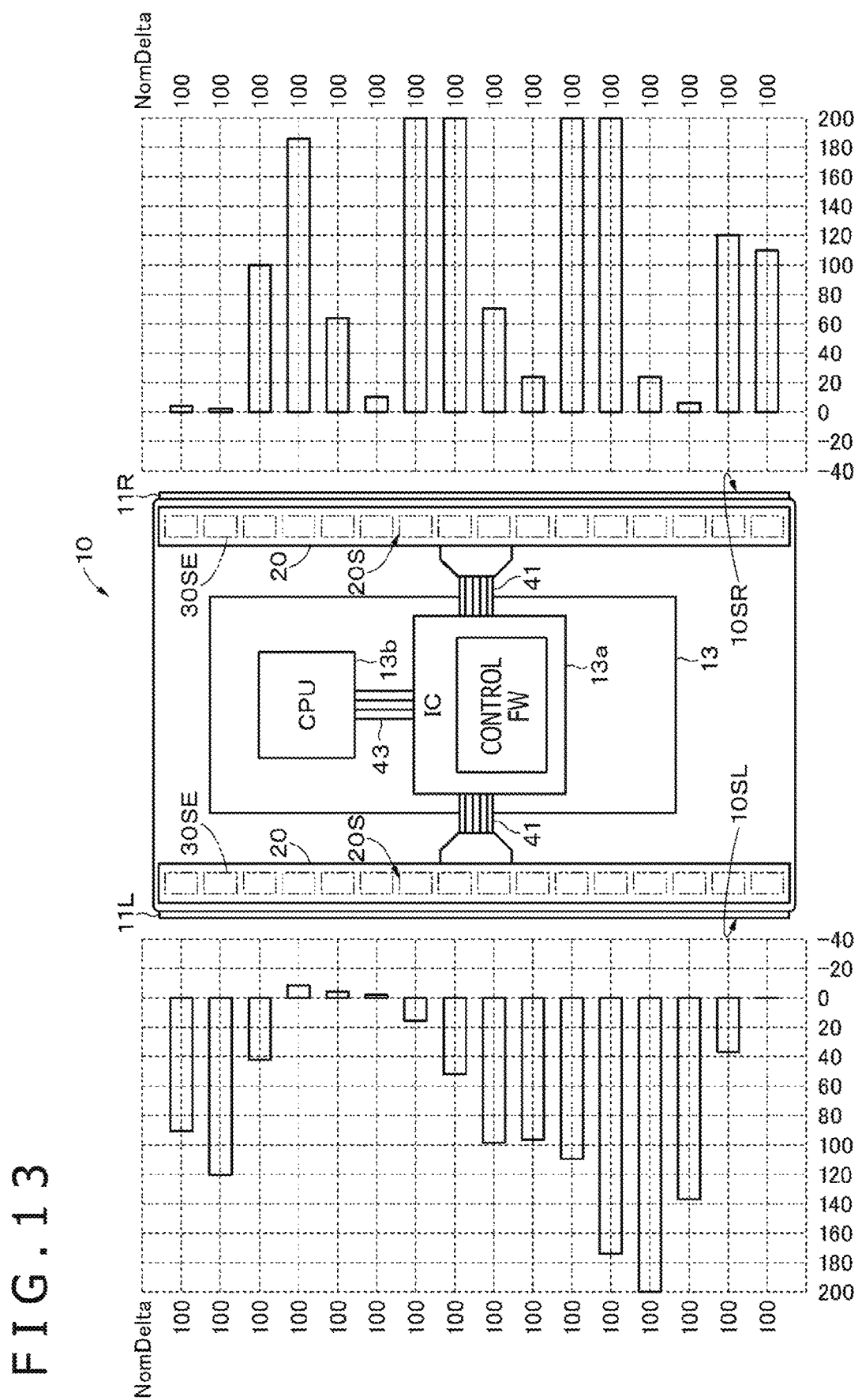
FIG. 13 is a schematic view depicting an example of a profile of an output value (delta value) when a user holds the electronic apparatus with the left hand.

First, in step S41, the IC 13*a* detects an output value (delta value) of each sensing portion 30SE. Then, in step S42, the IC 13*a* decides, on the basis of the output values of the sensing portions 30SE detected in step S41, with which one of the right hand and the left hand the user holds the electronic apparatus 10. In particular, the IC 13*a* decides the holding hand of the user from a correlation between a profile of the output values (delta values) outputted from all sensing portions 30SE and profiles for the right hand and the left hand stored in advance in a memory of the IC 13*a*. FIG. 13 depicts an example of the profile of output values (delta values) when the user holds the electronic apparatus 10 with the left hand.

In the case where it is decided in step S42 that the user holds the electronic apparatus 10 with the right hand, the IC 13*a* outputs a right hand holding detection interrupt signal to the CPU 13*b* in step S43. The right hand holding detection interrupt signal is a signal for requesting the CPU 13*b* to display a screen image for the right hand holding, and if the right hand holding detection interrupt signal is supplied from the IC 13*a* to the CPU 13*b*, then the CPU 13*b* displays a screen image for the right hand holding (for example, an application display, a manipulation menu display or the like).

On the other hand, in the case where it is decided in step S42 that the user holds the electronic apparatus 10 with the left hand, the IC 13*a* outputs a left hand holding detection interrupt signal to the CPU 13*b* in step S44. The left hand holding detection interrupt signal is a signal for requesting the CPU 13*b* to display a screen image for the left hand holding, and if the left hand holding detection interrupt signal is supplied from the IC 13*a* to the CPU 13*b*, then the CPU 13*b* displays a screen image for the left hand holding (for example, an application display, a manipulation menu display or the like).

Effect

In the electronic apparatus 10 according to the one embodiment, the sensor 20 includes the capacitive sensor electrode layer 30, the electrode substrate 21, and the elastic layer 23 provided between the electrode substrate 21 and the sensor electrode layer 30. The thickness of the elastic layer 23 is 100 µm or less, and besides, the weight per unit area of the elastic layer 23 is less than 3 mg/cm$^2$. Consequently, since the elastic layer 23 is thin and the elastic layer 23 is deformed easily by pressing of the side wall portions 11R and 11L, good sensitivity can be obtained.

Modification (Modification of Adhesive Layer)

The adhesive layer 25 may have conductivity. In this case, the sensitivity of the sensor 20 can be improved further. In the case where the adhesive layer 25 has conductivity, the thickness of the elastic layer 23 preferably is 50 μm or less, more preferably is 25 μm or less, and even more preferably is 10 μm or less. This is because, in the case where the thickness of the elastic layer 23 is 50 μm or less, the effect of sensitivity improvement of the sensor 20 appears remarkably.

In the case where the adhesive layer 25 has conductivity, the thickness of the elastic layer 23 may not be equal to or less than 100 μm, and the weight per unit area of the elastic layer 23 may not be smaller than 3 mg/cm$^2$. Even with this configuration, the effect of sensitivity improvement can be obtained. However, from a point of view of sensitivity improvement of the sensor 20, it is preferable to adopt, in combination, the adhesive layer 25 having conductivity and the elastic layer 23 whose thickness is equal to or less than 100 μm and whose weight per unit area is smaller than 3 mg/cm$^2$.

The adhesive layer 25 having conductivity includes an adhesive and a conductive material. The conductive material is, for example, at least one of conductive fillers or conductive polymers. As the shape of a conductive filler, for example, a spherical shape, an ellipsoidal shape, a needle shape, a plate shape, a scale shape, a tubular shape, a wire shape, a bar shape (rod shape), a fiber shape, and an irregular shape are applicable. However, the shapes mentioned are not restrictive. It is to be noted that conductive fillers of a same shape may be used alone or conductive fillers of two or more different shapes may be used in combination.

The conductive filler includes at least one type from among, for example, a carbon-based filler, a metal-based filler, a metal oxide-based filler, and a metal coated filler. Here, it is defined that the metal includes a semi-metal.

The carbon-based filler includes at least one type from among, for example, carbon black (for example, Ketjen Black or acetylene black), porous carbon, carbon fiber (for example, PAN-based or pitch-based carbon fiber), carbon nanofiber, fullerene, graphene, vapor grown carbon fiber (VGCF), carbon nanotube (for example, SWCNT or MWCNT), carbon micro coil, and carbon nanohorn.

The metal-based filler includes at least one type from among, for example, copper, silver, gold, platinum, palladium, nickel, tin, cobalt, rhodium, iridium, iron, ruthenium, osmium, manganese, molybdenum, tungsten, niobium, tantalum, titanium, bismuth, antimony, and lead.

The metal oxide-based filler includes, for example, indium tin oxide (ITO), zinc oxide, indium oxide, antimony-doped copper oxide, fluorinated zinc oxide, aluminum-doped zinc oxide, gallium-doped zinc oxide, silicon-doped zinc oxide, zinc oxide-tin oxide, indium oxide-tin oxide, and zinc oxide-indium oxide-magnesium oxide.

The metal coated filler is a base filler coated with metal. The base filler includes at least one type from among, for example, mica, glass beads, glass fiber, carbon fiber, calcium carbonate, zinc oxide, and titanium oxide. The metal that covers the base filler includes at least one type of, for example, Ni and Al.

The conductive polymer includes at least one type from among, for example, polyethylene dioxythiophene/polystyrene sulfonic acid (PEDOT/PSS), polyaniline, polyacetylene, and polypyrrole.

A surface resistance of the adhesive layer 25 preferably is, from a point of view of sensitivity improvement of the sensor 20, 100 Ω/cm$^2$ or less, more preferably is 50 Ω/cm$^2$ or less, and even more preferably is 20 Ω/cm$^2$ or less. The surface resistance of the adhesive layer 25 is determined in such a manner as described in "evaluation of conductivity of adhesive layer" in a working example described below.

(Modification 1 of Elastic Layer)

Figure 14:
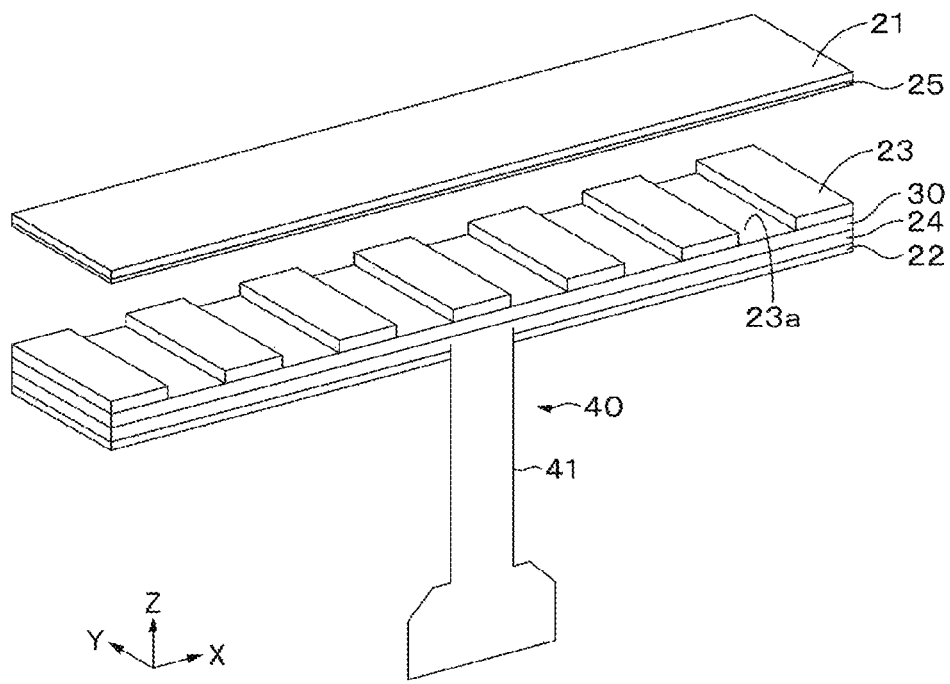
FIG. 14 is an exploded perspective view depicting a modification of an elastic layer.

The elastic layer 23 may have space portions 23a extending therethrough in a thicknesswise direction as depicted in FIG. 14. In this case, even if the elastic layer 23 is not a porous layer, the sensitivity of the sensor 20 can be improved. The space portions 23a preferably have a shape pattern. The space portions 23a may be provided in a regular pattern in an in-plane direction of the sensor 20 or in a random pattern. As a particular pattern shape the space portions 23a has, for example, a stripe shape, a mesh shape, a radial shape, a geometrical pattern shape, a meandering shape, a concentric shape, a spiral shape, a spider web shape, a tree shape, a fish bone shape, a ring shape, a lattice shape, an irregular shape and so forth are applicable. However, the shapes are not restrictive. The space portions 23a are preferably provided at positions corresponding to the sensing portions 30SE (in particular, positions on the sensing portions 30SE). This is because, when the side wall portion 11R or 11L is pressed, since a corresponding portion of the sensing portion 30SE of the electrode substrate 21 is easy to deform toward the sensor electrode layer 30, the sensitivity of the sensor 20 is improved.

The elastic layer 23 includes at least one type from among, for example, an adhesive, a foamed resin, and an elastomer. In the case where the polymer resin includes at least one material from among the adhesive, foamed resin, and elastomer, the elastic layer 23 may further include a film as a substrate such that at least one material is provided on the film. More particularly, for example, the elastic layer 23 may be configured such that at least one layer from among the adhesive layer, foamed resin layer, and elastomer layer is provided on the film.

The adhesive includes at least one type from among, for example, an acrylic-based adhesive, a silicone-based adhesive, and an urethane-based adhesive. The foamed resin is what is generally called a sponge and includes at least one type from among, for example, foamed polyurethane, foamed polyethylene, foamed polyolefin, and sponge rubber. The insulating elastomer includes at least one type from among, for example, silicone-based elastomer, acrylic-based elastomer, urethane-based elastomer, and styrene-based elastomer.

An area occupancy of the elastic layer 23 preferably is, from the point of view of sensitivity improvement of the sensor 20, 70% or less, more preferably is 50% or less, even more preferably is 25% or less, and especially preferably is 10% or less. Here, the "area occupancy of the elastic layer 23" signifies a ratio (($S2/S1$)×100) of an area $S2$ of the elastic layer 23 to an area $S1$ of the sensing face 20S.

(Modification 2 of Elastic Layer)

The elastic layer 23 may contain polymer resin having specific gravity of 1.34 or less. In this case, even if the elastic layer 23 is not a porous layer, the sensitivity of the sensor 20 can be improved. The specific gravity of the polymer resin preferably is, from the point of view of sensitivity improvement of the sensor 20, 1.3 or less, more preferably is 1.2 or less, and even more preferably is 1.1 or less. As the polymer resin having a specific gravity of 1.34 or less, for example, a polymer resin containing at least one type of polyethylene terephthalate, polymethyl methacrylate, and polyurethane is applicable. However, the resins mentioned are not restrictive. Although the lower limit value of the specific gravity of the polymer resin is not restricted specifically, it is, for example, 0.8 or more.

The specific gravity of the polymer resin is obtained in the following manner. First, a thickness T of the elastic layer 23 is obtained in a similar manner as that in the measurement method of the thickness of the elastic layer 23 described above. Then, mass M of the elastic layer 23 (=mass M1−mass M2) is calculated in a similar manner as that in the measurement method of the weight per unit area of the elastic layer 23 described hereinabove. Then, density of the polymer resin contained in the elastic layer 23 is calculated in accordance with the expression give below.

Density [g/cm$^3$] of polymer resin=(mass $M$ of elastic layer 23)/((thickness $T$ of elastic layer 23)×(area $S$ of elastic layer 23))

Finally, the specific gravity of the polymer resin contained in the elastic layer 23 is calculated in accordance with the expression given below.

Specific gravity of polymer resin=(density of polymer resin)/(density of water at 4° C.)

In the case where the elastic layer 23 contains polymer resin of a specific gravity of 1.34 or less, the elastic layer 23 has space portions 23a extending therethrough in the thicknesswise direction as described in connection with the "modification 2 of elastic layer" described above.

(Modification 3 of Elastic Layer)

The elastic layer 23 may contain a conductive material on a face thereof opposing to the REF electrode layer 21b. In this case, the sensitivity of the sensor 20 can be improved further. The density distribution of the conductive material in the elastic layer 23 preferably decreases from the REF electrode layer 21b toward the sensor electrode layer 30. The density distribution may be inclined gradually or may change stepwise.

In the case where the elastic layer 23 contains a conductive material in such a manner as described above, the thickness of the elastic layer 23 may not be equal to or smaller than 100 μm, and the weight per unit area of the elastic layer 23 may not be smaller than 3 mg/cm$^2$. Even with this configuration, the effect of sensitivity improvement can be obtained. However, from the point of view of sensitivity improvement of the sensor 20, it is preferable to adopt the elastic layer 23 that contains a conductive material and has a thickness of 100 μm or less and a weight per unit area smaller than 3 mg/cm$^2$.

(Modification 4 of Elastic Layer)

Figure 15:
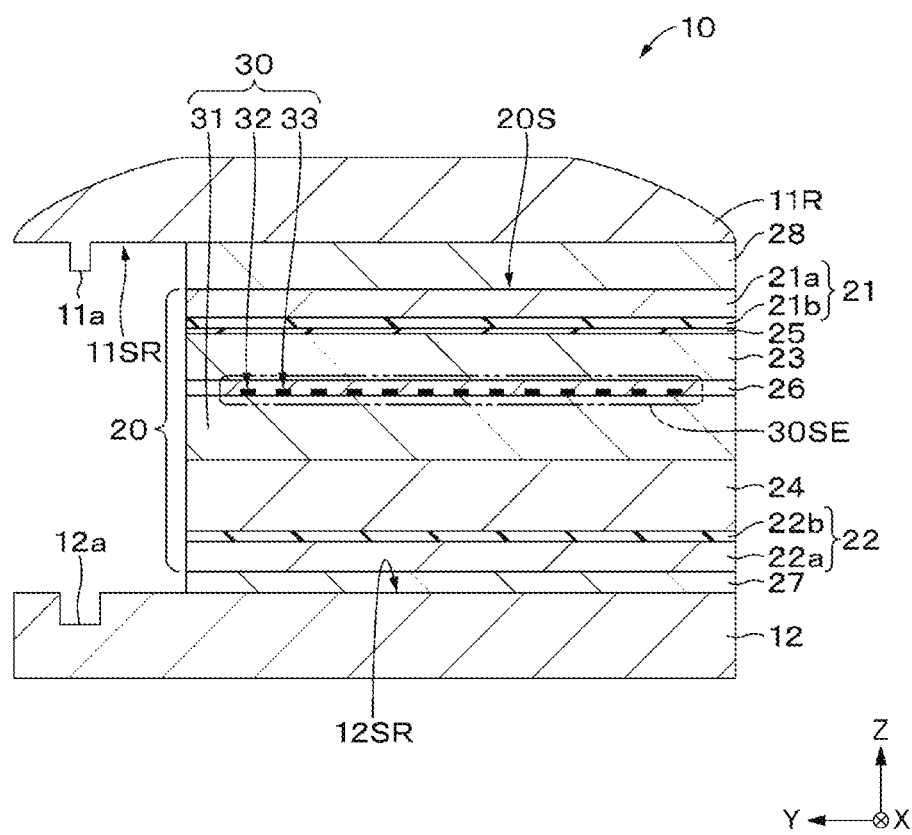
FIG. 15 is a sectional view depicting the modification of the elastic layer.
Figure 16:
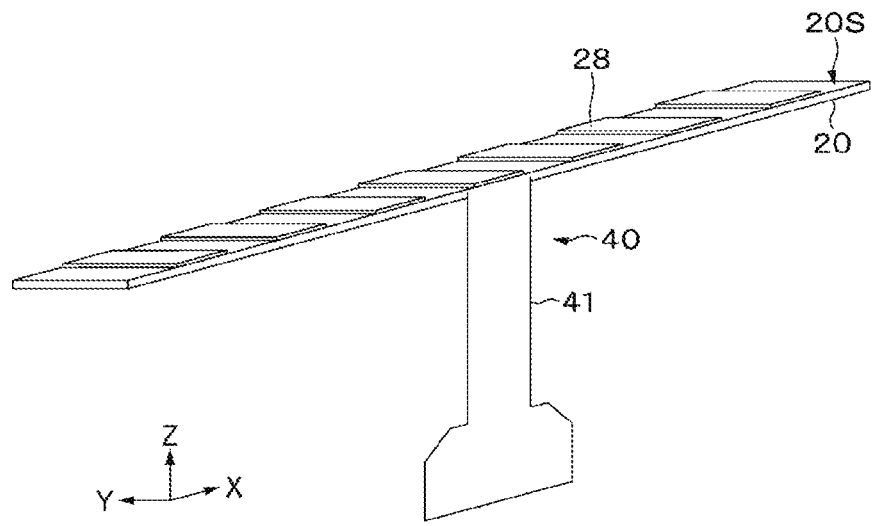
FIG. 16 is a perspective view depicting the modification of the elastic layer.

The electronic apparatus 10 may further include the elastic layer 28 provided between the sensing face 20S and the inner side face 11SR as depicted in FIG. 15. The elastic layer 28 may be provided continuously such that it fills up the entirety or almost the entirety of the sensing face 20S or may have a predetermined shape pattern as depicted in FIG. 16. The shape pattern may be a regular pattern or may be a random pattern. As a particular example of the shape pattern, for example, a stripe shape, a mesh shape, a radial shape, a geometrical pattern shape, a meandering shape, a concentric shape, a spiral shape, a spider web shape, a tree shape, a fish bone shape, a ring shape, a lattice shape, an irregular shape and so forth are applicable. However, the shapes mentioned are not restrictive. In the case where the elastic layer 28 has a shape pattern, preferably the shape pattern is provided at positions corresponding to the sensing portions 30SE (in particular, at positions on the sensing portions 30SE). Consequently, when the side wall portion 11R or 11L is pressed, the shape pattern functions as a pusher that pushes the sensing face 20S, and therefore, the pressing force is concentrated on a corresponding portion of the electrode substrate 21 to the sensing portion 30SE. Accordingly, the sensitivity of the sensor 20 can be improved.

Preferably, the elastic layers 23 and 28 satisfy at least one of the relations of the following expressions (1) to (3).

Elastic modulus of elastic layer 28≤elastic modulus of elastic layer 23 (1)

Thickness of elastic layer 28≥thickness of elastic layer 23 (2)

Area occupancy of elastic layer 28≤area occupancy of elastic layer 23 (3)

Here, the area occupancy of the elastic layer 23 signifies a ratio [%] of an area SB of the elastic layer 23 to an area SA of the sensing face 20S (=(SB/SA)×100). Meanwhile, the area occupancy of the elastic layer 28 signifies a ratio [%] of an area SC of the elastic layer 28 to the area SA of the sensing face 20S (=(SC/SA)×100).

Since the elastic layer 28 described above is provided between the sensing face 20S and the inner side face 11SR, in the case where there are a dispersion (tolerance) in dimension of the housing 11 and the frame 12 and so forth, the elastic layer 28 elastically deforms and collapses in place of the elastic layer 23. Accordingly, the dispersion (tolerance) in dimension of the housing 11 and the frame 12 and so forth can be absorbed. Therefore, the dynamic range in load sensitivity can be improved.

It is to be noted that the elastic layer 28 is provided between the sensing face 20S and the inner side face 11SL similarly as between the sensing face 20S and the inner side face 11SR.

The elastic layer 28 may be provided between the rear face of the sensor 20 and the support faces 12SR and 12SL of the frame 12 instead of between the sensing face 20S and the inner side faces 11SR and 11SL. Otherwise, the elastic layer 28 may be provided both between the sensing face 20S and the inner side faces 11SR and 11SL and between the rear face of the sensor 20 and the support faces 12SR and 12SL of the frame 12.

The elastic layer 28 may be provided between the rear face of the sensor 20 and the support faces 12SR and 12SL of the frame 12 instead of between the sensing face 20S and the inner side faces 11SR and 11SL. Otherwise, the elastic layer 28 may be provided both between the sensing face 20S and the inner side faces 11SR and 11SL and between the rear face of the sensor 20 and the support faces 12SR and 12SL of the frame 12.

(Modification of Electrode Substrate)

The substrate 21a is not required to be provided. In other words, the sensor 20 may include the REF electrode layer 21b in place of the electrode substrate 21. Similarly, also the substrate 22a is not required to be provided. In other words, the sensor 20 may include the REF electrode layer 22b in place of the electrode substrate 22.

(Modification 1 of Sensor)

Although the embodiment described hereinabove is directed to the configuration in which the sensor 20 includes the electrode substrate 22, the sensor 20 may not include the electrode substrate 22. However, in order to suppress external noise (external electric field) from entering the inside from the rear face of the sensor 20, that is, in order to suppress degradation of the detection accuracy or erroneous detect of the sensor 20 by external noise, preferably, the sensor 20 includes the electrode substrate 22.

(Modification 2 of Sensor)

The sensor 20 may include a sensor electrode layer of the self-capacitance type in place of the sensor electrode layer 30 of the mutual capacitance type. In this case, the sensor electrode layer includes a substrate and an electrode layer in the form of a thin film provided on the substrate.

(Modification 3 of Sensor)

Although the embodiment described above is configured such that the electronic apparatus 10 includes the sensors 20 on the inner side faces 11SR and 11SL of the side wall portions 11R and 11L individually, the sensor 20 may otherwise be provided on the inner side face of the bottom portion 11M of the housing 11 such that the IC 13a detects pressing on the bottom portion 11M. Alternatively, the sensor 20 may be provided on the inner side face of the front panel 14 such that the IC 13a detects pressing on the front panel 14.

(Modification 1 of Sensing Portion)

Although the embodiment described above is configured such that the plurality of sensing portions 30SE is arranged one-dimensionally so as to form a line in the X axis direction, the plurality of sensing portions 30SE may otherwise be arranged two-dimensionally so as to form two or more columns or the like.

(Modification 2 of Sensing Portion)

Although the embodiment described above is configured such that the sensor 20 includes the plurality of sensing portions 30SE, the sensor 20 may otherwise include a single sensing portion 30SE.

(Modification 1 of Electronic Apparatus)

The electronic apparatus 10 may include, as a sliding manipulation region, a zoom-in/zoom-out manipulation region, in which zoom-in and zoom-out manipulations of the camera 61 are possible by a sliding manipulation. In this case, it is sufficient if the IC 13a controls zoom-in and zoom-out of the camera 61 in response to a sliding manipulation for the zoom-in/zoom-out manipulation region.

(Modification 2 of Electronic Apparatus)

The electronic apparatus 10 may include, as a sliding manipulation region, a screen image manipulation region for performing a manipulation of a screen image display such as a screen image scroll or pointer movement by a sliding manipulation on the side faces 10SR and 10SL. In this case, it is sufficient if the IC 13a controls screen image display of screen image scroll or pointer movement in response to a sliding manipulation in the screen image manipulation region. It is to be noted that the sound volume adjustment region VR, the zoom-in/zoom-out manipulation region, and the screen image manipulation region may be a same region or may be regions different from one another.

(Example of Electronic Apparatus Other than Smartphone)

Although the embodiment described above is described taking a case in which the electronic apparatus is a smartphone as an example, the present disclosure is not limited to this and can be applied to various electronic apparatuses having an exterior body such as a housing. For example, the present disclosure can be applied to a personal computer, a portable telephone set other than a smartphone, a television set, a remote controller, a camera, a game machine, a navigation system, an electronic book, an electronic dictionary, a portable music player, a wearable terminal such as a smart watch or a head-mounted display, a radio, a stereo set, a medical apparatus, and a robot.

(Example Other than Electronic Apparatus)

The present disclosure is not restricted to an electronic apparatus and can be applied to various things other than an electronic apparatus. For example, the present disclosure can also be applied to electronic apparatuses such as an electric tool, a refrigerator, an air conditioner, a water heater, a microwave oven, a dishwasher, a washing machine, a dryer, an illumination apparatus, and a toy. Further, the present disclosure can also be applied to a building including a house, a building component, a vehicle, furniture such as a table or a desk, a manufacturing apparatus, an analytical instrument and so forth. As the building component, for example, a paving stone, a wall material, a floor tile, and a floorboard are applicable. As the vehicle, for example, a rolling stock (for example, an automobile and a motorcycle), a ship, a submarine, a railcar, an airplane, a spaceship, an elevator, and playground equipment are applicable.

WORKING EXAMPLES

Although, in the following, the present disclosure is described in detail in connection with working examples, the present disclosure is not restricted to the working examples alone. It is to be noted that, in the following working examples, portions corresponding to those of the embodiment described above are denoted by like reference signs.

Working Examples in which Material of Elastic Layer is Changed, Comparative Examples Working Examples 1-1 to 1-4

By stacking members specified below, sensors 20 of an elongated rectangular film shape having the configuration depicted in FIG. 4 are produced.

Electrode substrate 21: polyester film having aluminum deposited thereon (by Nakai Industrial Co., Ltd., product name: METALITE (registered trademark) (50 µm thick))

Adhesive layer 25: double-sided adhesive film (by NEION Film Coatings Corp., product name: Neo Fix 10 (10 µm thick))

Elastic layer 23: nanofiber layers (1) to (4) depicted in Table 1 (10 to 100 µm thick, weight per unit area 0.2 to 2.5 mg/cm$^2$)

Adhesive layer 26: double-sided adhesive film (by NEION Film Coatings Corp., product name: Neo Fix 10 (10 µm thick))

Sensor electrode layer 30: FPC

Gap layer 24: double-sided adhesive film (by NEION Film Coatings Corp., product name: Neo Fix 100 (100 µm thick))

Electrode substrate 22: polyester film having aluminum deposited thereon (by Nakai Industrial Co., Ltd., product name: METALITE (registered trademark) (50 µm thick))

It is to be noted that the nanofiber layers (1) to (4) used as the elastic layer 23 were produced in the following manner. First, polyurethane (by Miractran, E660MNAT) was prepared as a constituent material. Then, 13 grams of the polyurethane were dissolved in 84 grams of N, N'-dimethylformamide, and then 7 grams of the solution were mixed by a beads mill. By this, spinning solution for forming nanofiber was obtained. Then, spinning was performed using this spinning solution. In particular, the spinning solution was put into a syringe and spinning was performed on a PET substrate having aluminum deposited thereon. By the steps, a nanofiber layer was formed on the PET substrate having aluminum deposited thereon. The spinning was performed using an electrospinning apparatus (by MECC CO., LTD., NANON).

Working Example 1-5

The sensor 20 was produced similarly as in the working example 1-1 except that a nanofiber layer of the working example 1-2 compressed to the thickness of 25 μm was used as the elastic layer 23.

Working Example, 1-6

The sensor 20 was produced similarly as in the working example 1-1 except that a nanofiber layer of the working example 1-1 compressed to the thickness of 25 μm was used as the elastic layer 23.

Working Examples 1-7 to 1-9

The sensors 20 were produced similarly as in the working example 1-1 except that unwoven fabric (by Hirose Paper Mfg Co., Ltd., product name: 05TH-8, 05TH-5, 05TH-15S) depicted in Table 1 was used as the elastic layer 23.

Comparative Examples 1-1 to 1-3

The sensor 20 was produced similarly as in the working example 1-1 except that foamed films (polyurethane foam films) (by Inoac Corporation, product name: PureCell S020, PureCell S010, PORON EXT) depicted in Table 1 were used as the elastic layer 23.

[Evaluation of Sensitivity]

The sensitivity of each sensor 20 was evaluated in the following manner. In particular, a load was applied to the sensing face 20S first, and the delta value (output value of the sensor 20) when the sensing face 20S deformed by 5 μm in the thicknesswise direction of the sensor 20 was measured. It is to be noted that the position to which the load was applied was a position on a sensing portion 30SE of the sensing face 20S. Then, the sensitivity of the sensor 20 was evaluated in accordance with the following criteria on the basis of results of the measurement.

Sensitivity is good: the delta value when the sensing face 20S deformed by 5 μm is greater than 5

Sensitivity is not good: the delta value when the sensing face 20S deformed by 5 μm is equal to or lower than 5

It is to be noted that the reason why the deformation amount of the sensing face 20S was determined as 5 μm in the evaluation described above is as described below. In particular, this is because, in the case where the housing 11 of the general electronic apparatus 10 (for example, a smartphone or a tablet) is pressed intentionally for the object of a predetermined manipulation, the housing 11 ordinarily deforms at least by approximately 5 μm.

Further, the reason why whether or not the sensitivity is good was evaluated using the delta value "5" as a boundary value in the evaluation described above is as follows. In particular, this is because, if the delta value when the sensing face 20S was deformed by 5 μm was 5 or less, then the delta value becomes a same level as noise and there is the possibility that it may become impossible to detect pressing on the sensing face 20S of the sensor 20 (that is, pressing on the housing 11 of the electronic apparatus 10).

Table 1 indicates a configuration and an evaluation result of the elastic layer 23 of the working examples 1-1 to 1-9 and the comparative examples 1-1 to 1-3.

TABLE 1

| | | Elastic layer | | | | | |
|---|---|---|---|---|---|---|---|
| | Material | Product name (manufacturer name) | Thickness (μm) | Area occupancy (%) | Weight per unit area (mg/cm$^2$) | Sensitivity upon deformation by 5 μm | Sensitivity evaluation result |
| Working example 1-1 | Nanofiber layer (1) | — | 100 | 100 | 2.5 | 8 | Good |
| Working example 1-2 | Nanofiber layer (2) | — | 50 | 100 | 1.6 | 10 | Good |
| Working example 1-3 | Nanofiber layer (3) | — | 25 | 100 | 0.9 | 20 | Good |
| Working example 1-4 | Nanofiber layer (4) | — | 10 | 100 | 0.2 | 50 | Good |
| Working example 1-5 | Nanofiber layer (5) | — | 25 | 100 | 1.6 | 18 | Good |
| Working example 1-6 | Nanofiber layer (6) | — | 25 | 100 | 2.5 | 15 | Good |
| Working example 1-7 | Nonwoven fabric | 05TH-8 (Hirose Paper) | 30 | 100 | 0.8 | 15 | Good |
| Working example 1-8 | Nonwoven fabric | 05TH-5 (Hirose Paper) | 20 | 100 | 0.5 | 30 | Good |
| Working example 1-9 | Nonwoven fabric | 05TH-15S (Hirose Paper) | 20 | 100 | 1.5 | 20 | Good |
| Comparative example 1-1 | Foamed film | Purecell S020 (Inoac) | 200 | 100 | 5 | 2 | Not good |
| Comparative example 1-2 | Foamed film | Purecell S010 (Inoac) | 100 | 100 | 3 | 5 | Not good |
| Comparative example 1-3 | Foamed film | Purecell EXT (Inoac) | 100 | 100 | 9 | 2 | Not good |

Figure 17:
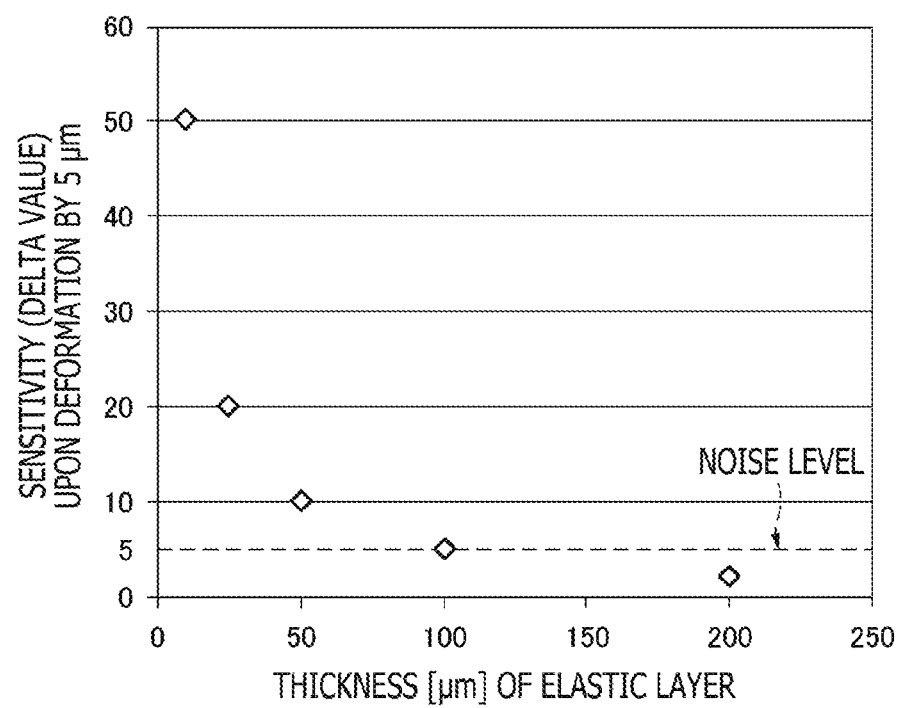
FIG. 17 is a graph depicting an evaluation result of sensors of working examples 1-2 to 1-4 and comparative examples 1-1 and 1-2.

The following can be recognized from Table 1 and FIG. 17.

By setting the film thickness of the elastic layer 23 to 100 μm or less and setting the weight per unit area to less than 3 mg/cm$^2$, the delta value when the sensing face 20S is deformed by 5 μm can be made higher than 5.

In the case where a nanofiber layer or unwoven fabric is used as the elastic layer 23, the film thickness and the weight per unit area of the elastic layer 23 described above can be obtained. On the other hand, in the case where a foamed film is used as the elastic layer 23, it is difficult to obtain the film thickness and the weight per unit area of the elastic layer 23 described above.

It is to be noted that, also in the case where a foamed film is used as the elastic layer 23, if the thickness of the foamed film is made thinner, then it is considered possible to make the weight per unit area smaller than 3 mg/cm$^2$. However, for manufacturing reasons, it is difficult to form a foamed film of a thickness less than 100 μm.

Working Example and Comparative Example in which Area Occupancy of Elastic Layer is Changed Working Examples 2-1 to 2-4

The sensors 20 were produced similarly as in the working example 1-1 except that a striped double-sided adhesive film (Neo Fix 30 by NEION Film Coatings Corp. shape-processed into stripes) depicted in Table 1 was used as the elastic layer 23. It is to be noted that the double-sided adhesive film was arranged such that the space portions 23a are provided on the sensing portions 30SE.

Comparative Example 2-1

The sensor 20 was produced similarly as in the working example 1-1 except that an elongated rectangular double-sided adhesive film (Neo Fix 30 by NEION Film Coatings Corp.) depicted in Table 1 was used as the elastic layer 23.
[Evaluation of Sensitivity]

The sensitivity of the sensor 20 was evaluated similarly as in the evaluation method of the sensitivity of the working example 1-1.

Table 2 indicates a configuration and an evaluation result of the elastic layer 23 of the working examples 2-1 to 2-4 and the comparative example 2-1.

From Table 2, the following can be recognized. In particular, also in the case where a double-sided adhesive film is used as the elastic layer 23, by setting the area occupancy of the double-sided adhesive film to 70% or less, the weight per unit area can be made lower than 3 mg/cm$^2$. Accordingly, good sensitivity can be obtained.

Working Example and Comparative Example in which Specific Gravity of Elastic Layer is Changed Working Examples 3-1 to 3-3, Comparative Example 3-1

The sensors 20 were produced similarly as in the working example 1-1 except that a striped film (polymer resin layer) depicted in Table 3 was used as the elastic layer 23. It is to be noted that the double-sided adhesive film was arranged such that the space portions 23a are provided at the sensing portions 30SE.

[Evaluation of Sensitivity]

The sensitivity of the sensors 20 was evaluated similarly as in the evaluation method of the sensitivity of the working example 1-1.

Table 3 indicates a configuration and an evaluation result of the elastic layer 23 of the working examples 3-1 to 3-3 and the comparative example 3-1.

TABLE 2

| | | Elastic layer | | | | | |
|---|---|---|---|---|---|---|---|
| | Material | Product name (manufacturer name) | Thickness (μm) | Area occupancy (%) | Weight per unit area (mg/cm$^2$) | Sensitivity upon deformation by 5 μm | Sensitivity evaluation result |
| Comparative example 2-1 | Rectangular double-sided adhesive film | NeoFix30 (NEION Film Coatings) | 30 | 100 | 4 | 1 | Not good |
| Working example 2-1 | Striped double-sided adhesive film | NeoFix30 (NEION Film Coatings) | 30 | 70 | 2.8 | 6 | Good |
| Working example 2-2 | Striped double-sided adhesive film | NeoFix30 (NEION Film Coatings) | 30 | 50 | 2 | 8 | Good |
| Working example 2-3 | Striped double-sided adhesive film | NeoFix30 (NEION Film Coatings) | 30 | 25 | 1 | 20 | Good |
| Working example 2-4 | Striped double-sided adhesive film | NeoFix30 (NEION Film Coatings) | 30 | 10 | 0.4 | 40 | Good |

TABLE 3

| | Material | Thickness (μm) | Specific gravity | Area occupancy (%) | Weight per unit area (mg/cm$^2$) | Sensitivity upon deformation by 5 μm | Sensitivity evaluation result |
|---|---|---|---|---|---|---|---|
| Comparative example 3-1 | Striped PVDF film | 30 | 1.7 | 70 | 3.6 | 3 | Not good |
| Working example 3-1 | Striped PEI film | 30 | 1.34 | 70 | 2.8 | 6 | Good |
| Working example 3-2 | Striped PMMA film | 30 | 1.2 | 70 | 2.5 | 10 | Good |
| Working example 3-3 | Striped PU film | 30 | 1.1 | 70 | 2.3 | 15 | Good |

PVDF: polyvinylidene fluoride
PET: polyethylene terephthalate
PMMA: polymethyl methacrylate
PU: polyurethane From Table 3, the following can be recognized. In the case where a film of the area occupancy of 70% is used as the elastic layer 23, by setting the specific gravity of the polymer resin included in the elastic layer 23 to 1.34 or less, the weight per unit area can be made lower than 3 mg/cm$^2$. Accordingly, good sensitivity can be obtained.

Working Example and Comparative Example in which Material of Elastic Layer is Change Working Example 4-1, Comparative Examples 4-1 and 4-2

The sensors 20 were produced similarly as in the working example 1-1 except that unwoven fabric (by KB SEIREN Ltd., UHF-60, UHF-30, UHF-25) depicted in Table 4 was used as the elastic layer 23.

Working Examples 4-2 and 4-3

The sensors 20 were obtained similarly as in the working example 1-1 except that a striped double-sided adhesive film (Neo Fix 30 by NEION Film Coatings Corp. shape-processed into stripes) depicted in Table 4 was used as the elastic layer 23. It is to be noted that the double-sided adhesive film was arranged such that the space portions 23a are provided on the sensing portions 30SE.

Comparative Examples 4-3 and 4-4

The sensors 20 were produced similarly as in the working example 1-1 except that an elongated rectangular double-sided adhesive film (Neo Fix 100, 30 by NEION Film Coatings Corp.) depicted in Table 4 was used as the elastic layer 23.

Comparative Examples 4-5 to 4-16

The sensors 20 were obtained similarly as in the working example 1-1 except that foamed films (by Inoac Corporation, product name: PureCell, Poron) depicted in Table 4 were used as the elastic layer 23.

[Evaluation of Displacement Rate]

The displacement rate of each sensor 20 was evaluated in the following manner. In particular, a load of 50 kPa was applied to the sensing face 20S first, and a displacement amount ΔZ of the sensing face 20S in the thicknesswise direction of the sensor 20 was measured. It is to be noted that the position to which the load was applied was a position at a sensing portion 30SE of the sensing face 20S. Then, the displacement rate of the elastic layer 23 was calculated in accordance with the following expression.

Displacement rate (%)=(ΔZ/T)×100 where T is the thickness of the elastic layer 23 in a state before the load is applied.

It is to be noted that the reason why the load to be applied to the sensing face 20S was made 50 kPa is as follows. In particular, the reason is that, in the case where the housing 11 of a general electronic apparatus 10 (for example, a smartphone or a tablet) is pressed intentionally for the object of a predetermined manipulation, a load at least of approximately 50 kPa is applied normally to the housing 11.

Table 4 indicates a configuration and an evaluation result of the elastic layer 23 of the working examples 4-1 to 4-3 and the comparative examples 4-1 to 4-16.

TABLE 4

| | | Elastic layer | | | | | |
|---|---|---|---|---|---|---|---|
| | Material | Product name (manufacturer name) | Thickness (μm) | Area occupancy (%) | Volume density (mg/cm$^3$) | Weight per unit area (mg/cm$^2$) | Displacement rate (%) |
| Working example 1-1 | Nanofiber layer (1) | — | 100 | 100 | — | 2.5 | 18 |
| Working example 1-2 | Nanofiter layer (2) | — | 50 | 100 | — | 1.6 | 44 |
| Working example 1-3 | Nanofiter layer (3) | — | 25 | 100 | — | 0.9 | 50 |
| Working example 1-4 | Nanofiter layer (4) | — | 10 | 100 | — | 0.2 | 60 |

TABLE 4-continued

| | | Elastic layer | | | | | |
|---|---|---|---|---|---|---|---|
| | Material | Product name (manufacturer name) | Thickness (μm) | Area occupancy (%) | Volume density (mg/cm$^3$) | Weight per unit area (mg/cm$^2$) | Displacement rate (%) |
| Comparative example 4-1 | Nonwoven fabric | UHF-60 (KB SEIREN) | 200 | 100 | — | 5 | 17 |
| Comparative example 4-2 | Nonwoven fabric | UHF-30 (KB SEIREN) | 100 | 100 | — | 3 | 20 |
| Working example 4-1 | Nonwoven fabric | UHF-25 (KB SEIREN) | 90 | 100 | — | 2.5 | 25 |
| Comparative example 4-3 | Rectangular double-sided adhesive film | NeoFix100 (NEION Film Coatings) | 100 | 100 | 1340 | 13.4 | 1 |
| Comparative example 4-4 | Rectangular double-sided adhesive film | NeoFix30 (NEION Film Coatings) | 30 | 100 | 1340 | 4 | 1 |
| Working example 4-2 | Striped double-sided adhesive film | NeoFix30 (NEION Film Coatings) | 30 | 25 | 335 | 1 | 40 |
| Working example 4-3 | Striped double-sided adhesive film | NeoFix30 (NEION Film Coatings) | 30 | 10 | 134 | 0.4 | 50 |
| Comparative example 4-5 | Foamed film | Purecell 010 (Inoac) | 100 | 100 | 300 | 3 | 10 |
| Comparative example 4-6 | Foamed film | Purecell S010 (Inoac) | 100 | 100 | 300 | 3 | 20 |
| Comparative example 4-7 | Foamed film | PORON EXT (Inoac) | 100 | 100 | 900 | 9 | 2 |
| Comparative example 4-8 | Foamed film | Purecell 020 (Inoac) | 200 | 100 | 250 | 5 | 2 |
| Comparative example 4-9 | Foamed film | Purecell S020 (Inoac) | 200 | 100 | 250 | 5 | 30 |
| Comparative example 4-10 | Foamed film | PORON SR-S-15P (Inoac) | 500 | 100 | 150 | 7.5 | 55 |
| Comparative example 4-11 | Foamed film | PORON SR-S-20P (Inoac) | 300 | 100 | 200 | 6 | 39 |
| Comparative example 4-12 | Foamed film | PORON SR-S-32P (Inoac) | 200 | 100 | 320 | 6.4 | 23 |
| Comparative example 4-13 | Foamed film | PORON SR-S-48P (Inoac) | 300 | 100 | 480 | 14.4 | 9 |
| Comparative example 4-14 | Foamed film | PORON SR-S-70P (Inoac) | 150 | 100 | 700 | 10.5 | 5 |
| Comparative example 4-15 | Foamed film | PORON SS-24P (Inoac) | 1000 | 100 | 240 | 24 | 51 |
| Comparative example 4-16 | Foamed film | PORON SS-32P (Inoac) | 500 | 100 | 320 | 16 | 30 |

Figure 18A:
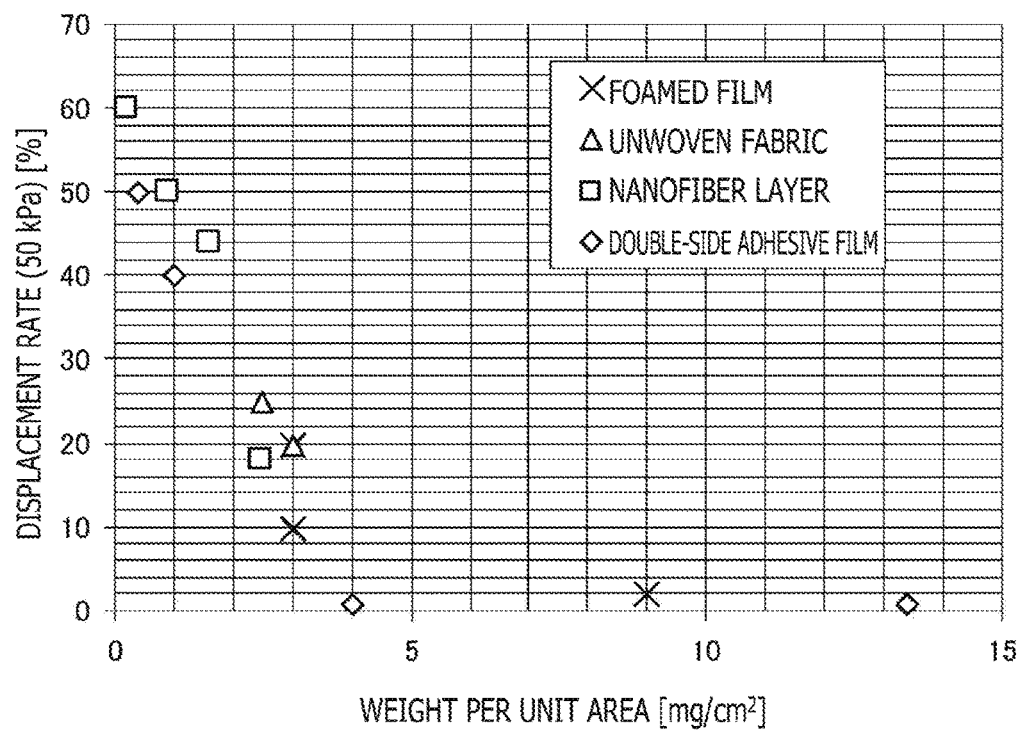
FIG. 18A is a graph depicting an evaluation result of sensors of working examples 1-1 to 1-4 and 4-1 to 4-4 and comparative examples 4-2 and 4-3.

It can be recognized from FIG. 18A that, since, if the weight per unit area is 4 mg/cm$^2$ or more, there is a tendency that the displacement rate becomes very low, there is the possibility that it may become difficult to detect that the housing 11 is intentionally pressed for the object of a predetermined manipulation.

Figure 18B:
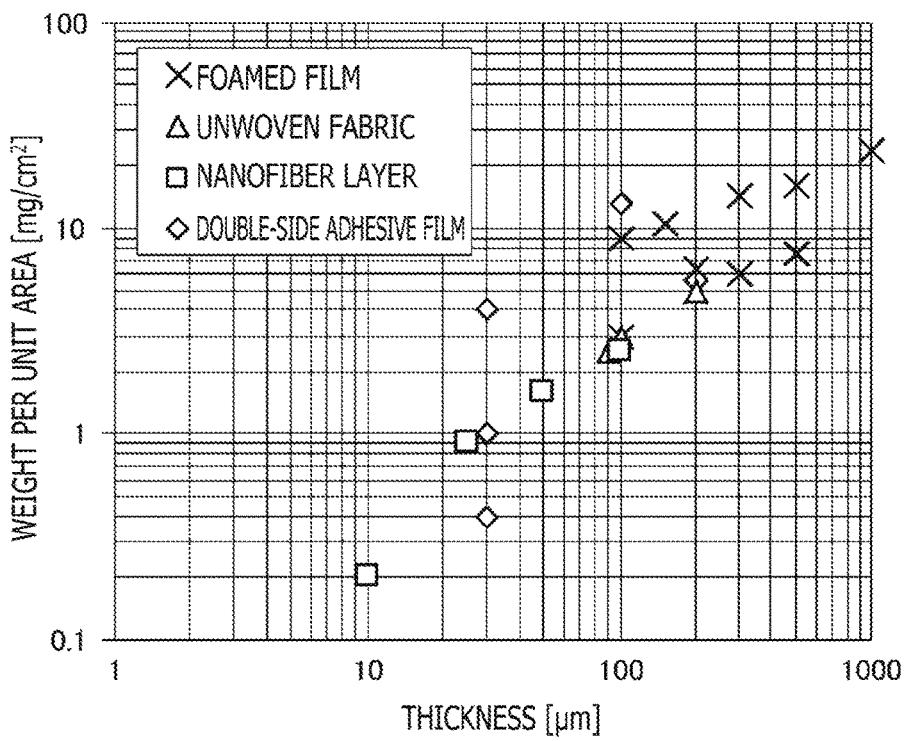
FIG. 18B is a graph depicting an evaluation result of the working examples 1-1 to 1-4 and 4-1 to 4-4 and comparative examples 4-1 to 4-15.

The following can be recognized from FIG. 18B. Where a foamed film is used, it is difficult to make the weight per unit area less than 3 mg/cm$^2$ even if the thickness is adjusted. It is to be noted that, as described above, it is difficult to form a foamed film having a thickness of less than 100 μm for manufacturing reasons. On the other hand, where unwoven fabric or a nanofiber layer is used, it is possible to make the weight per unit area less than 3 mg/cm$^2$ by adjusting the thickness. Further, even where an adhesive film is used, the weight per unit area can be made less than 3 mg/cm$^2$ by adjusting the thickness and the area occupancy.

Working Example in which Conductive Sticky Layer is Provided Between Electrode Substrate and Elastic Layer Working Examples 5-1 to 5-4

The sensors 20 having configurations similar to those of the working examples 1-1 to 1-4 were produced except that a conductive adhesive film (by Tatsuta Electric Wire Cable, product name: SF-CA55) depicted in Table 5 was used as the adhesive layer 25.

Working Examples 5-5 to 5-7

The sensors 20 having a configuration similar to that of the working example 1-3 were produced except that conductive adhesive films (by Tatsuta Electric Wire Cable, product name: SF-PC5600-C, SF-PC5900-C, SF-PC4300) depicted in Table 5 were used as the adhesive layer 25.

Working Example 5-8

The sensor 20 having a configuration similar to that of the working examples 1-1 to 1-4 was produced except that a conductive adhesive film (by KB SEIREN Ltd., product name: M305CS) depicted in Table 5 was used as the adhesive layer 25.

[Evaluation of Conductivity of Adhesive Layer]

The conductivity of the adhesive layer (sticky layer) 25 used in the working examples 1-1 to 1-4 and 5-1 to 5-8 was evaluated in the following manner. First, the adhesive layer (sticky layer) 25 was adjusted to a size of a width of 1 cm and a length of 10 cm, the positive and negative electrodes of an electric measuring instrument (by TOYO Corporation Si-1260, 1296) were contacted with the opposite ends of a long side (opposing short sides) of the adhesive layer 25, and then the resistance at 1000 Hz was measured by the electric measuring instrument. Then, the surface resistance per 1 cm$^2$ was calculated by dividing the measurement value by a measurement area (10 cm$^2$).

[Evaluation of Sensitivity]

The sensitivity of the sensors 20 was evaluated similarly as in the evaluation method of the sensitivity in the working example 1-1.

Table 5 indicates a configuration and an evaluation result of the elastic layer 23 and the adhesive layer 25 of the working examples 1-1 to 1-4 and 5-1 to 5-8.

the thickness of the adhesive layer 25 having conductivity is different) that the sensitivity of the sensor 20 does not rely upon the thickness of the adhesive layer 25 having conductivity.

While the embodiment of the present disclosure, modifications, and working examples are described above particularly, the present disclosure is not restricted to the embodiment and the working examples described above, and various modifications based on the technical idea of the present disclosure are possible.

For example, the configurations, methods, steps, shapes, materials, numerical values and so forth specified in the embodiment, modifications, and working examples described above are nothing but examples to the end, and a

TABLE 5

| | Elastic layer | | | Adhesive layer | | | | |
| --- | --- | --- | --- | --- | --- | --- | --- | --- |
| | Material | Film thickness (μm) | Weight per unit area (mg/cm$^2$) | Presence of conductivity | Product name (manufacturer name) | Thickness (μm) | Surface resistance (Ω/cm$^2$) | Sensitivity upon deformation by 5 μm | Sensitivity evaluation result |
| Working example 1-1 | Nanofiber layer (1) | 100 | 2.5 | No | NeoFix10 (NEION Film Coatings) | 10 | 10000 or more | 8 | Good |
| Working example 1-2 | Nanofiber layer (2) | 50 | 1.6 | No | NeoFix10 (NEION Film Coatings) | 10 | 10000 or more | 10 | Good |
| Working example 1-3 | Nanofiber layer (3) | 25 | 0.9 | No | NeoFix10 (NEION Film Coatings) | 10 | 10000 or more | 20 | Good |
| Working example 1-4 | Nanofiber layer (4) | 10 | 0.2 | No | NeoFix10 (NEION Film Coatings) | 10 | 10000 or more | 50 | Good |
| Working example 5-1 | Nanofiber layer (1) | 100 | 2.5 | Yes | SF-CA55 (Tatsuta Electric Wire Cable) | 13 | 0.23 | 10 | Good |
| Working example 5-2 | Nanofiber layer (2) | 50 | 1.6 | Yes | SF-CA55 (Tatsuta Electric Wire Cable) | 13 | 0.23 | 15 | Good |
| Working example 5-3 | Nanofiber layer (3) | 25 | 0.9 | Yes | SF-CA55 (Tatsuta Electric Wire Cable) | 13 | 0.23 | 40 | Good |
| Working example 5-4 | Nanofiber layer (4) | 10 | 0.2 | Yes | SF-CA55 (Tatsuta Electric Wire Cable) | 13 | 0.23 | 100 | Good |
| Working example 5-5 | Nanofiber layer (3) | 25 | 0.9 | Yes | SF-PC5600-C (Tatsuta Electric Wire Cable) | 10 | 2.1 | 40 | Good |
| Working example 5-6 | Nanofiber layer (3) | 25 | 0.9 | Yes | SF-PC5900-C (Tatsuta Electric Wire Cable) | 3 | 1.2 | 40 | Good |
| Working example 5-7 | Nanofiber layer (3) | 25 | 0.9 | Yes | SF-PC4300 (Tatsuta Electric Wire Cable) | 18 | 0.08 | 40 | Good |
| Working example 5-8 | Nanofiber layer (3) | 25 | 0.9 | Yes | M305CS (SEIREN) | 20 | 0.7 | 40 | Good |

It can be recognized from the evaluation result of the working examples 1-1 to 1-4 and 5-1 to 5-4 that the sensitivity can be improved by using a material having conductivity as the adhesive layer 25. Further, it can be recognized that, as the thickness of the elastic layer 23 increases, manifestation of the effect of sensitivity improvement becomes more noticeable.

It can be recognized from the evaluation result of the working examples 5-3 and 5-5 to 5-8 (samples among which configuration, a method, a step, a shape, a material, a value and so forth different from those described above may be used as occasion demands.

Further, the configurations, methods, steps, shapes, materials, numerical values and so forth of the embodiment, modifications, and working examples described above can be combined to each other without departing from the subject matter of the present disclosure.

Also it is possible for the present disclosure to adopt the configurations described below.

(1)
A sensor, including:
a capacitive sensor electrode layer;
a reference electrode layer; and
an elastic layer provided between the sensor electrode layer and the reference electrode layer, in which
a thickness of the elastic layer is 100 μm or less, and
a weight per unit area of the elastic layer is less than 3 mg/cm².

(2)
The sensor according to (1), in which
the elastic layer includes a porous layer.

(3)
The sensor according to (1), in which
the elastic layer includes a fiber layer.

(4)
The sensor according to (3), in which
the fiber layer includes unwoven fabric or woven fabric.

(5)
The sensor according to (3) or (4), in which
the fiber layer includes a nanofiber.

(6)
The sensor according to any one of (1) to (5), in which
the elastic layer has a space portion.

(7)
The sensor according to (6), in which
the space portion has a shape pattern.

(8)
The sensor according to (6) or (7), in which
the sensor electrode layer includes a sensing portion that detects capacitance corresponding to a distance from the reference electrode layer, and
the space portion is provided at a position corresponding to the sensing portion.

(9)
The sensor according to any one of (6) to (8), in which
an area occupancy of the elastic layer is 70% or less.

(10)
The sensor according to any one of (1) to (9), in which
the elastic layer includes polymer resin whose specific gravity is 1.34 or less.

(11)
The sensor according to any one of (1) to (10), in which
the thickness of the elastic layer is 50 μm or less.

(12)
The sensor according to any one of (1) to (11), further including:
an adhesive layer provided between the elastic layer and the reference electrode layer, in which
the adhesive layer has electrical conductivity.

(13)
The sensor according to (12), in which
a surface resistance of the adhesive layer is 100 Ω/cm² or less.

(14)
The sensor according to (12) or (13), in which
the adhesive layer contains at least one of a conductive filler or a conductive polymer.

(15)
The sensor according to any one of (1) to (14), in which
the elastic layer includes a conductive material on a side of the elastic layer opposing to the reference electrode layer.

(16)
An inputting device, including:
an exterior body;
the sensor according to any one of (1) to (15); and
a support for supporting the sensor so as to oppose to the exterior body.

(17)
An electronic apparatus, including:
an exterior body;
the sensor according to any one of (1) to (15); and
a support for supporting the sensor so as to oppose to the exterior body.

(18)
The electronic apparatus according to (17), in which
the exterior body is a housing, and
the support supports the sensor so as to oppose to an inner side face of the housing.

REFERENCE SIGNS LIST

10 Electronic apparatus
11 Housing
11M Bottom portion
11R, 11L Side wall portion
11SR, 11SL Inner side face
11VR Sound volume adjustment region
11CR Camera holding region
11SHR Shutter manipulation region
12 Frame
12SR, 12SL Support face
13 Board
13a Controller IC
13b CPU
14 Front panel
14a Display device
20 Sensor
20S Sensing face
21, 22 Electrode substrate
21a, 22a Substrate
21b, 22b Reference electrode layer
23, 28 Elastic layer
24 Gap layer
25 to 27 Adhesive layer
30 Sensor electrode layer
30SE Sensing portion
31 Substrate
32 Pulse electrode (first electrode)
33 Sense electrode (second electrode)
32a, 33a Wire
34a, 34b Ground electrode
40 Flexible printed board
41 Connection portion
42 Connection terminal
43 Bus
51 GPS section
52 Wireless communication section
53 Sound processing section
54 Microphone
55 Speaker
56 NFC communication section
57 Power supply section
58 Storage section
59 Vibrator
60 Motion sensor
61 Camera

The invention claimed is:

1. A sensor, comprising:
a capacitive sensor electrode layer;
a first reference electrode layer; and
an elastic layer provided between the capacitive sensor electrode layer and the first reference electrode layer, wherein the elastic layer includes a conductive material with a density distribution that decreases from the first reference electrode layer towards the capacitive sensor electrode layer,
a thickness of the elastic layer is 100 μm or less, and
a weight per unit area of the elastic layer is less than 3 mg/cm$^2$.

2. The sensor according to claim 1, wherein
the elastic layer includes a porous layer.

3. The sensor according to claim 1, wherein
the elastic layer includes a fiber layer.

4. The sensor according to claim 3, wherein
the fiber layer includes unwoven fabric or woven fabric.

5. The sensor according to claim 3, wherein
the fiber layer includes a nanofiber.

6. The sensor according to claim 1, wherein
the elastic layer has a space portion.

7. The sensor according to claim 6, wherein
the space portion has a shape pattern.

8. The sensor according to claim 6, wherein
the capacitive sensor electrode layer includes a sensing portion that detects capacitance corresponding to a distance between the capacitive sensor electrode layer and the first reference electrode layer, and
the space portion is provided at a position corresponding to the sensing portion.

9. The sensor according to claim 6, wherein
an area occupancy of the elastic layer is 70% or less.

10. The sensor according to claim 1, wherein
the elastic layer includes polymer resin whose specific gravity is 1.34 or less.

11. The sensor according to claim 1, wherein
the thickness of the elastic layer is 50 μm or less.

12. The sensor according to claim 1, further comprising
an adhesive layer provided between the elastic layer and the first reference electrode layer, wherein
the adhesive layer has electrical conductivity.

13. The sensor according to claim 12, wherein
a surface resistance of the adhesive layer is 100 Ω/cm2 or less.

14. The sensor according to claim 12, wherein
the adhesive layer contains at least one of a conductive filler or a conductive polymer.

15. The sensor according to claim 1, wherein
the elastic layer includes a conductive material on a side of the elastic layer opposing to the first reference electrode layer.

16. The sensor according to claim 1, further comprising
a second reference electrode layer, different from the first reference electrode layer, arranged opposed to a first surface of the capacitive sensor electrode layer, wherein the first reference electrode layer is arranged opposed to a second surface of the capacitive sensor electrode layer, and wherein the first surface is opposed to the second surface.

17. The sensor according to claim 16, further comprising
a gap layer provided between the second reference electrode layer and the capacitive sensor electrode layer and an initial capacitance of the sensor is based on the thickness of the gap layer.

18. An inputting device, comprising:
an exterior body;
the sensor according to claim 1; and
a support for supporting the sensor so as to oppose to the exterior body.

19. An electronic apparatus, comprising:
an exterior body;
the sensor according to claim 1; and
a support for supporting the sensor so as to oppose to the exterior body.

20. The electronic apparatus according to claim 19, wherein
the exterior body is a housing, and
the support supports the sensor so as to oppose to an inner side face of the housing.

* * * * *